United States Patent
Tong et al.

(10) Patent No.: US 12,442,835 B2
(45) Date of Patent: Oct. 14, 2025

(54) PROBE CARD SYSTEM, METHOD OF MANUFACTURING PROBE CARD SYSTEM, METHOD OF USING PROBE CARD SYSTEM

(71) Applicants: ND-HI TECHNOLOGIES LAB, INC., Taipei (TW); ETRON TECHNOLOGY, INC., Hsinchu (TW)

(72) Inventors: Ho-Ming Tong, Taipei (TW); Chao-Chun Lu, Hsinchu (TW)

(73) Assignees: ND-HI TECHNOLOGIES LAB, INC., Taipei (TW); ETRON TECHNOLOGY, INC., Hsinchu (TW)

( * ) Notice: Subject to any disclaimer, the term of this patent is extended or adjusted under 35 U.S.C. 154(b) by 299 days.

(21) Appl. No.: 18/355,255

(22) Filed: Jul. 19, 2023

(65) Prior Publication Data

US 2024/0027494 A1    Jan. 25, 2024

Related U.S. Application Data

(60) Provisional application No. 63/390,684, filed on Jul. 20, 2022.

(51) Int. Cl.
| | |
|---|---|
| G01R 1/073 | (2006.01) |
| G01R 1/04 | (2006.01) |
| G01R 1/067 | (2006.01) |
| G01R 1/20 | (2006.01) |
| G01R 3/00 | (2006.01) |
| G01R 31/00 | (2006.01) |
| G01R 31/26 | (2020.01) |
| G01R 31/28 | (2006.01) |

(52) U.S. Cl.
CPC ..... *G01R 1/07342* (2013.01); *G01R 1/06783* (2013.01); *G01R 3/00* (2013.01)

(58) Field of Classification Search
CPC .......... G01R 1/04; G01R 1/067; G01R 1/073; G01R 1/20; G01R 3/00; G01R 31/00; G01R 31/26; G01R 31/28
See application file for complete search history.

(56) References Cited

U.S. PATENT DOCUMENTS

| | | | |
|---|---|---|---|
| 2003/0010976 A1* | 1/2003 | Grube | G01R 31/2886 257/48 |
| 2006/0053625 A1* | 3/2006 | Kim | C25D 1/003 29/874 |
| 2015/0123690 A1* | 5/2015 | Kung | G01R 1/07378 324/756.03 |

* cited by examiner

*Primary Examiner* — Neel D Shah
(74) *Attorney, Agent, or Firm* — WPAT, P.C.; Anthony King

(57) ABSTRACT

A probe card system is provided. The probe card system, including a tester assembly, a probe head body configured to couple with the tester assembly, a first interconnection structure on a first side of the probe head body, and a probe layer structure on the first interconnection structure on the first side of the probe head body which is configured to engage with a wafer under test (WUT). The probe layer structure includes a sacrificial layer in connection with the first interconnection structure, a bonding layer in connection with the sacrificial layer, and a plurality of probe tips each in connection with respective conductive patterns exposed from the bonding layer and electrically coupled to the first interconnection structure. The sacrificial layer allows removal of the bonding layer and the plurality of probe tips via an etching operation. A method of manufacturing a probe card system is also provided.

20 Claims, 29 Drawing Sheets

PROBE CARD SYSTEM, METHOD OF MANUFACTURING PROBE CARD SYSTEM, METHOD OF USING PROBE CARD SYSTEM

PRIORITY CLAIM AND CROSS-REFERENCE

This application claims the benefit of prior-filed U.S. provisional application No. 63/390,684, filed on Jul. 20, 2022, and incorporates by reference herein in its entirety.

FIELD

This disclosure relates in general to a probe card system, a method for manufacturing the probe card system, and a method for using the probe card system, and more particularly, the probe card system includes an interconnect structure associated with an interposer for ultrafine-pitch, ultrahigh-I/O, full-wafer probing with high probe tip-to-bump/pad alignment accuracy.

BACKGROUND

For high-end applications such as high performance computing (HPC), data centers, artificial intelligence (AI) and smart handhelds, the cost of IC (integrated circuit) scaling is increasing exponentially for system-on-chip (SoC). So is the associated development cost which has grown from US$217M for 7 nm to about US$590M for 3 nm. Adding to the complexity and costs are the industry's increasing reliance on complex advanced SiPs (system-in-a-packages) to package advanced ICs. Advanced SiPs described herein include 2.5D IC as shown in FIG. 1A, fan-out SiP as shown in FIG. 1B, embedded SiP as shown in FIG. 1C, silicon photonics as show in FIG. 1D and 3D ICs based on chip-to-wafer (C2W) assembly as shown in FIG. 1E, and wafer-to-wafer (W2W) assembly as shown in FIG. 1F. Advanced SiPs can also include chiplets-in-SiPs to enable high-end SoC partitioning using chiplets and one or more of the advanced SiP technologies described in FIGS. 1A to 1F for yield, cost, time-to-market and performance. All advanced SiPs involve integration of multiple dies, and some SiPs (e.g., 2.5D and 3D ICs) can contain wafer-level components with tiny through silicon vias (TSVs) as small as ~5 μm diameter (with ~30 μm in depth which is equivalent to silicon substrate thickness) in thin active ICs such as high-bandwidth-memory (HBM) dynamic random-access memory (DRAM) chips and fine L (line width)/S (line spacing) redistribution layers (RDL) with a L/S of 2 μm/2 μm and below.

In FIG. 1A, a 2.5D IC structure 90 includes a laminate substrate 901 supporting a silicon interposer 902 through a plurality of solder connections 903. The silicon interposer 902 which is commonly used in 2.5D IC packaging and contains through silicon vias (TSVs) 904 can be used as a platform to bridge fine-L/S/pitch capability gap between the laminate substrate 901 and IC blocks covering a 3D IC such as a HBM DRAM stack, i.e., the memory structure 905 and a processor IC 907 in FIG. 1A. On the silicon interposer 902 produced by wafer-level processes, a wide variety of electronic components including memory devices (e.g., the memory structure 905), logic ICs (e.g., the processor IC 907), MEMS (micro-electro-mechanical system) devices, and passive devices can be mounted on the top side (i.e., the chip side) of the silicon interposer 902, while the electronic components can be arranged in the form of 2D IC, 2.5D IC or 3D IC package. For instance, the memory structure 905 in FIG. 1A can be a HBM DRAM stack which includes a plurality of DRAM dies 905a vertically stacked over a base (or a control) die 905b through copper pillar micro-bumps or copper hybrid bonding layers. When needed, at least one of the electronic components mounted on the silicon interposer can be embedded inside the interposer. As shown in FIG. 1A, the laminate substrate 901 upon which the silicon interposer 902 is bonded using micro-bumps or solder bumps can be bonded to a printed circuit board, PCB (not shown in the figure) through a plurality of ball grid array (BGA) solder balls 906 underneath the laminate substrate 901.

In FIG. 1B, a fan-out package structure 91 can be adopted with electrical connections on chips, 913a and 913b, fanned-out from the chip's active surfaces to enable placement of external I/Os 903a beyond the confines of the chips. The fan-out package structure 91 which includes one or more semiconductor chips (e.g., the chip 913a and the chip 913b) allows individual chips to be connected to the fan-out wiring layers 911, and coupled with the solder bumps 903a or alternatively, micro bumps, depending on applications. As depicted in FIG. 1B, the fan-out package structure 91 which is produced by wafer-level fan-out processes is bonded to a substrate 901 which can be a laminate substrate, an interposer or a fan-out package structure and which, in turn, is bonded to a next-level substrate using solder bumps or solder balls 906.

In FIG. 1C, an embedded SiP 92 includes one or more device 923 embedded in the laminate substrate 901. The one (or more) device 923 can be an embedded silicon interconnect (which can be either a passive device or an active device), an active device or an embedded passive device such as a capacitor or an inductor. Furthermore, the laminate substrate 901 having the device 923 embedded therein can be further bonded to another laminate substrate or PCB 908 through solder balls 906 or micro-bumps, depending on applications.

In FIG. 1D, a silicon photonics structure 93 includes a CMOS die 916, a waveguide structure 918, a modulator 919 and a photodetector 920 embedded in the waveguide structure 918, and an optical fiber 921 coupling optical signal into or out from the waveguide structure 918. A laser diode 917 and the waveguide structure 918 as well as the components coupled to the waveguide structure are integrated over a silicon interposer 914 with TSVs. The silicon interposer 914 produced by wafer-level processes is configured to be mounted on a substrate through a plurality of solder bumps 903 (or micro-bumps as needed) or hybrid bonding structures for external connections.

In FIG. 1E, a C2W structure 94 includes a first carrier 940, a first die 941, and a second die 942. The first die 941 and the second die 942 are placed over the first carrier 940 through various suitable bonding technologies including flip chip assembly based on micro-bumps and copper hybrid bonding. The first carrier 940 can be an active device or a passive device including an interposer with through vias 943 and the first carrier 940 serve as the platform to interconnect the first and the second dies and the substrate (not shown) upon which the C2W structure is mounted.

In FIG. 1F, a W2W structure 95 includes a first carrier 951, a second carrier 952, and an interconnect layer 953 electrically coupling the first carrier 951 and the second carrier 952. The interconnect layer 953 includes flip chip bonding, polyimide (PI)-to-PI or oxide-to-oxide based copper hybrid bonding, or other suitable bonding structures. Through vias 954 can be formed, for example, in the first carrier 951 to establish electrical connections between the substrate (not shown) upon which the W2W structure is mounted using solder bumps or balls 955, the first carrier 951, and the second carrier 952.

The race is on for lots more advanced packaging involving advanced ICs and advanced wafer-level packaging components. For years, the industry at its technology forefront has been using flip chip based on copper pillar solder micro-bumps to assemble advanced multi-chip SiPs comprising 2.5D IC, 3D IC, fan-out, embedded SiP and silicon photonics, and also chiplets-in-SiPs assembled based on combinations of the technologies to build the advanced SiPs including those illustrated in FIG. 1A to FIG. 1F. The most advanced flip chip in mainstream production today incorporates micro-bumps at a pitch of 40 µm with bump size of 25 µm bump and a spacing between adjacent bumps of 15 µm. Moving forward, efforts are underway to scale micro-bumps down to 20 µm or possibly even to 10 µm pitches for highest-end, high-pin-count applications including HPC, data centers and AI. At 20 µm pitches, the bump or pad sizes are less than 10 µm. In parallel to flip chip scaling, momentum is building to adopt copper hybrid bonding for applications requiring a pitch of 10 µm and beyond with limited production successes already demonstrated for sub-10 µm pitches.

Advanced SiP packaging, whether being based on flip chip or hybrid bonding, is confronted by a multitude of IC, IC assembly and test challenges when ultrafine pitches and ultrahigh-I/O, or ultrahigh pin-counts is involved in making the packaging components, particularly, wafer-level components including advanced ICs with contact pads and interposers for high-end applications including HPC, data centers, and AI. One of the bigger, and sometimes forgotten, challenges facing advanced SiPs is the ability to obtain and test known-good-die (KGD; and equivalently known-good wafer-level packaging components such as interposers and fan-out packages) in wafer form involving large, thin, high-power, high-cost, advanced digital ICs for high-end applications. The challenges escalate for advanced SiP designs involving 2.5D and 3D chip stacking of multiple high-end dies wherein inadvertent use of a defective, high-cost die (or wafer-level packaging component) will lead to catastrophic consequences in yield, cost, time-to-market and even reliability. For example, today, the most advanced chiplets-in-SiPs being developed can contain over 40 chiplets (and a variety of wafer-level packaging components), and hence the ability to ensure KGD turns out to be a crucial factor in developing an economically viable production plan covering advanced ICs and advanced wafer-level packaging components.

In forming the advanced SiPs, 300 mm wafers often times need to be thinned to an unprecedented small thickness, for instance, from 775 µm to 30 µm for HBM DRAM using chemical-mechanical polishing (CMP) which inadvertently can induce new defects due to thermal and thermo-mechanical stresses. 2.5D IC is enabled by silicon interposer with TSVs and RDLs on both the top side (chip side) and the bottom side (BGA ball side) of the interposer (see the silicon interposer 902 in FIG. 1A). Similarly, TSVs and RDL (or extension of wafer backend-of-line, BEOL, layers) can also be created in HBM DRAM dies based on 300 mm wafers to ready them for 3D stacking (see the DRAM dies 905*a* and the memory device 905 in FIG. 1A). New defects related to, for example, the adhesion/barrier layer, to the liner layer, through-via-fill by copper electroplating, alignment, etc. can also be found in these ultrathin, ultrahigh-I/O wafers with TSVs and RDLs. SiPs contain multiple dies and their yield risk is driven by the lowest yielding IC (or packaging component). At times, costly high yielding memory in memory stacks may need to be scrapped because of undetected defects on other devices in the stacks. Further complicating the matter is high- and/or low-temperature testing (e.g., from −55° C. to 150° C.) is often needed for high-end and automotive applications to weed out marginal defects in a device.

Advanced wafer test capabilities and solutions must be developed to test for KGD for advanced IC nodes and advanced SiPs involving wafer-level processes to minimize scrap assemblies, improve product margins and enable the industry to venture into the uncharted territory of ultrafine-pitch and ultrahigh-I/O interconnections involving ever-higher numbers of active dies and wafer-level packaging components, the main staple of advanced ICs and advanced SiPs going forward for high-end applications such as HPC, data centers and AI The test cost is also increasingly higher for advanced ICs and advanced SiPs with decreasing pitch, increasing pad/probe count and increasing parallelism particularly for high-end applications. This means complex advanced ICs and complex advanced SiPs embodying advanced ICs and advanced wafer-level packaging components require high yields, and multibillion dollar lifetime revenue per design in order for them to be economically viable.

SUMMARY

It is one aspect of the present disclosure to provide a probe card system for full-wafer test, including a tester assembly, a probe head body configured to be electrically coupled to the tester assembly, a first interconnection structure on a first side of the probe head body, and a probe layer structure on the first interconnection structure on the first side of the probe head body which is configured to engage with a wafer under test (WUT). The probe layer structure includes a sacrificial layer in connection with the first interconnection structure, a bonding layer in connection with the sacrificial layer, and a plurality of probe tips each in connection with respective conductive patterns exposed from the bonding layer and electrically coupled to the first interconnection structure. The sacrificial layer allows removal of the bonding layer and the plurality of probe tips via an etching operation.

It is another aspect of the present disclosure to provide a method of manufacturing a probe card system wherein the method includes the operations below. A carrier wafer having a first surface to be masked is received. A cavity in the carrier wafer is formed from the masked first surface. A probe tip is formed by filling the cavity with a conductive material. An interposer is received, wherein the interposer includes a probe head body, and a first interconnection structure on a first side of the probe head body. The first surface of the carrier wafer and the first interconnection structure of interposer are bonded. The probe tip from the carrier wafer is released by an etching operation.

It is yet another aspect of the present disclosure to provide a method of using a probe card system wherein the method includes the operations below. An interposer is received, wherein the interposer includes a probe head body; a first interconnection structure on a first side of the probe head body; and a probe layer structure on the first side of the probe head body which is configured to engage with a wafer under test (WUT). The probe layer structure includes a first sacrificial layer in connection with the first interconnection structure; a bonding layer in connection with the compliant layer deposited on the sacrificial layer; and a plurality of probe tips each in connection with respective conductive patterns exposed from the bonding layer and electrically connected to the first interconnection structure. Next, an engagement layer is formed on at least one of the bonding layer of the interposer or a contact terminal layer of the WUT. The engagement layer engages the interposer and the WUT at a first temperature without necessarily forming an electrical connection between the probe tips and contact terminals of the contact terminal layer. Then, an electrical connection is formed between the probe tips and contact terminals at a second temperature, wherein the second temperature is greater than the first temperature.

BRIEF DESCRIPTION OF THE DRAWINGS

Aspects of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

Figure 1A:
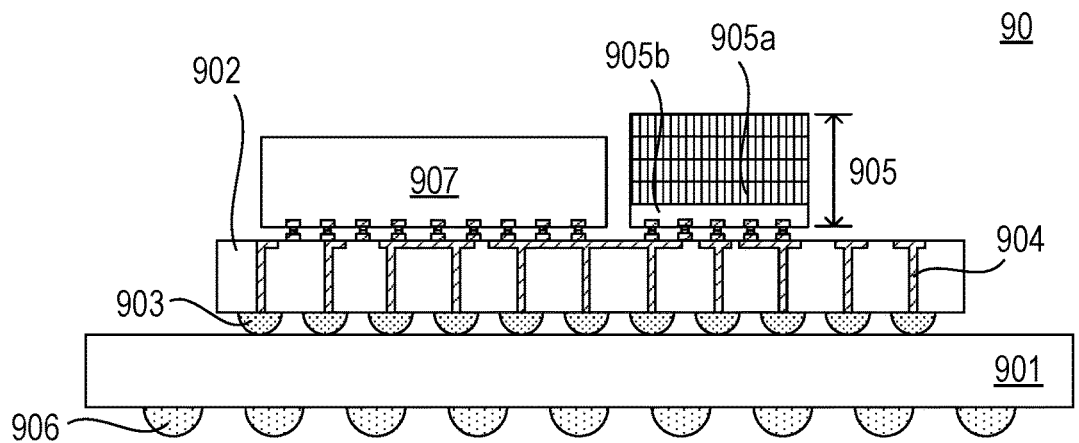
FIG. 1A to FIG. 1F illustrate various advanced system-in-a-packages (SIPs).
Figure 1B:
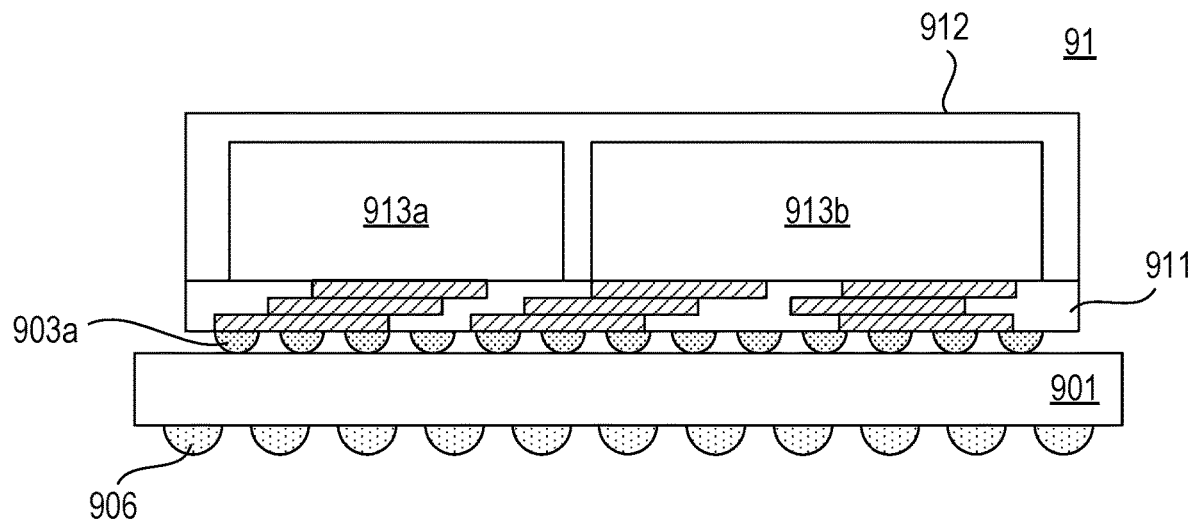
Figure 1C:
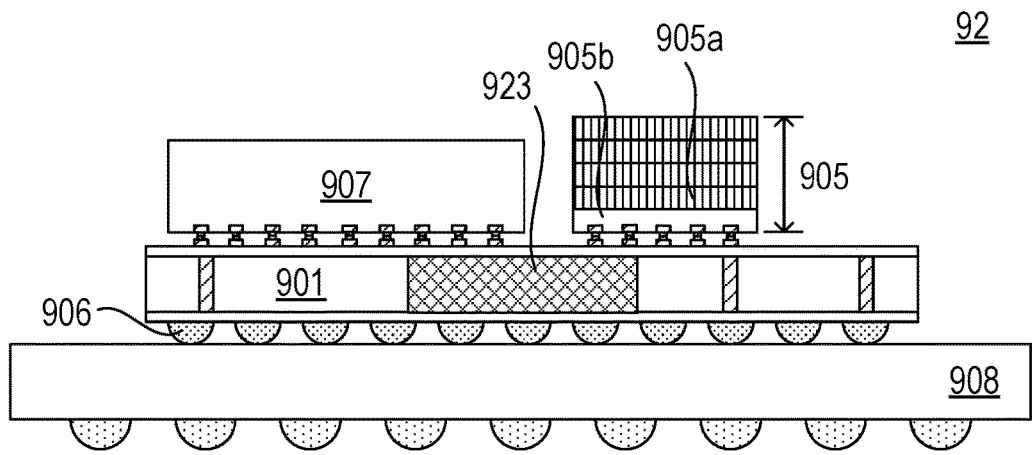
Figure 1D:
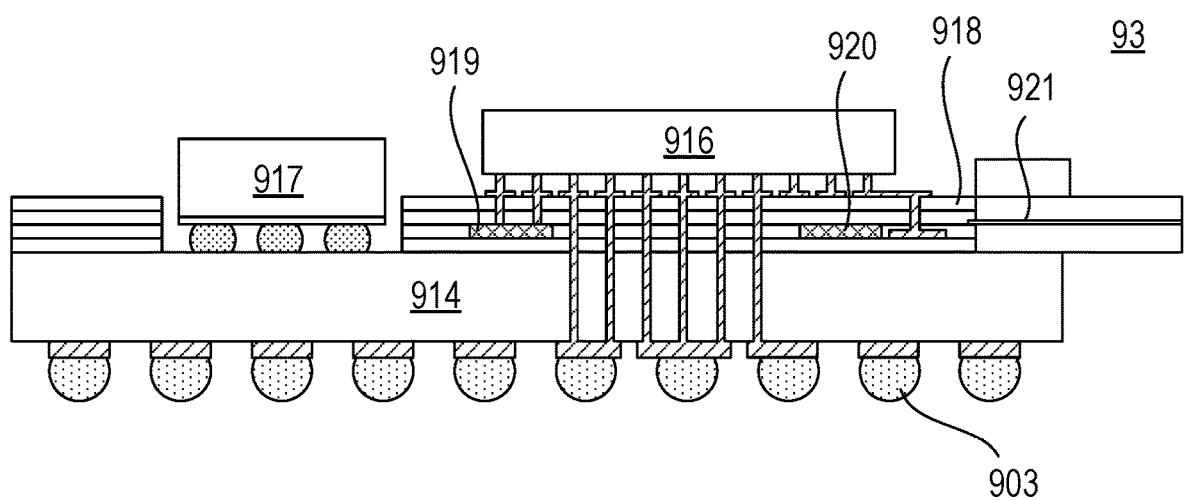
Figure 1E:
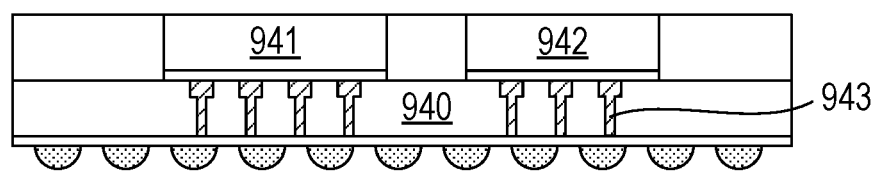
Figure 1F:
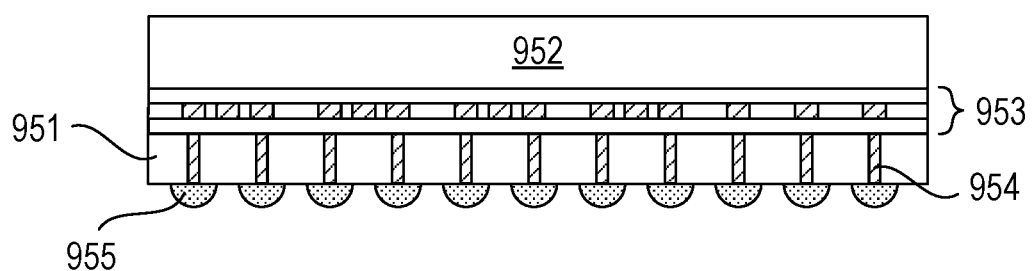

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

DETAILED DESCRIPTION

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first", "second" and "third" describe various elements, components, regions, layers and/or sections, these elements, components, regions, layers and/or sections should not be limited by these terms. These terms may be only used to distinguish one element, component, region, layer, or section from another. The terms such as "first", "second", and "third" when used herein do not imply a sequence or order unless clearly indicated by the context.

While chip makers strive to develop a range of design-for-test (DFT) technologies such as boundary scan, built-in-self-test (BIST) and redundancy and repair, another breakthrough the industry needs a new class of probe cards that will allow a wafer (e.g., an active IC wafer or a wafer-level packaging component) containing ultrafine-pitch micro-bumps or metal pads at 20 µm, 10 µm, or even sub-10 µm pad pitches to be tested with sufficient test coverage using a wafer test station that can handle 100,000 contacts or more on a wafer. DFTs with wrappers, for instance, can help reduce the numbers of I/O (input/output) pads that need to be contacted and probed during wafer test. With regard to probe cards, micro-electro-mechanical system (MEMS) based and membrane based technologies are being explored for 40 µm and below pitches. The MEMS approach is championed by FormFactor which is developing MEMS based fine-pitch probe cards that target at 40 µm and below pitches. IMEC and Cascade Microtech, on the other hand, have been working in early development stages on a rocking beam interposer (RBI) probe card technology to achieve 35 µm pitch. Pitches below 40 µm present huge challenges on the fabrication of probe card components and the nanotechnology and MEMS (micro-electro-mechanical) processes needed for producing fine probes, carrier and substrate structures for precision requirements.

There exists an enormous gap between what the probe industry can offer, and what advanced ICs and advanced SiPs require in KGD at sub-40 µm pitches today and at sub-10 µm or sub-/6 µm pitches in the near future. The singly most important barrier to implementation of complex advanced SiPs is the availability of affordable KGD involving advanced ICs on 300 mm wafers and 300 mm wafer-level packaging components such as interposers at different stages of wafer-level processing (while still in wafer form).

The present disclosure provides methodologies, processes and structures of a probe card system to enable ultrafine-pitch, ultrahigh-I/O, multi-temperature full-wafer, wafer-level probing of micro-bumps or metal pads at 40 µm and below pitches using reusable interposer based probe card systems with the coefficients of thermal expansion (CTEs) of the interposer probe cards closely matching that of silicon (~3 ppm/° C.) for high probe tip to bump/pad alignment accuracy.

Figure 2:
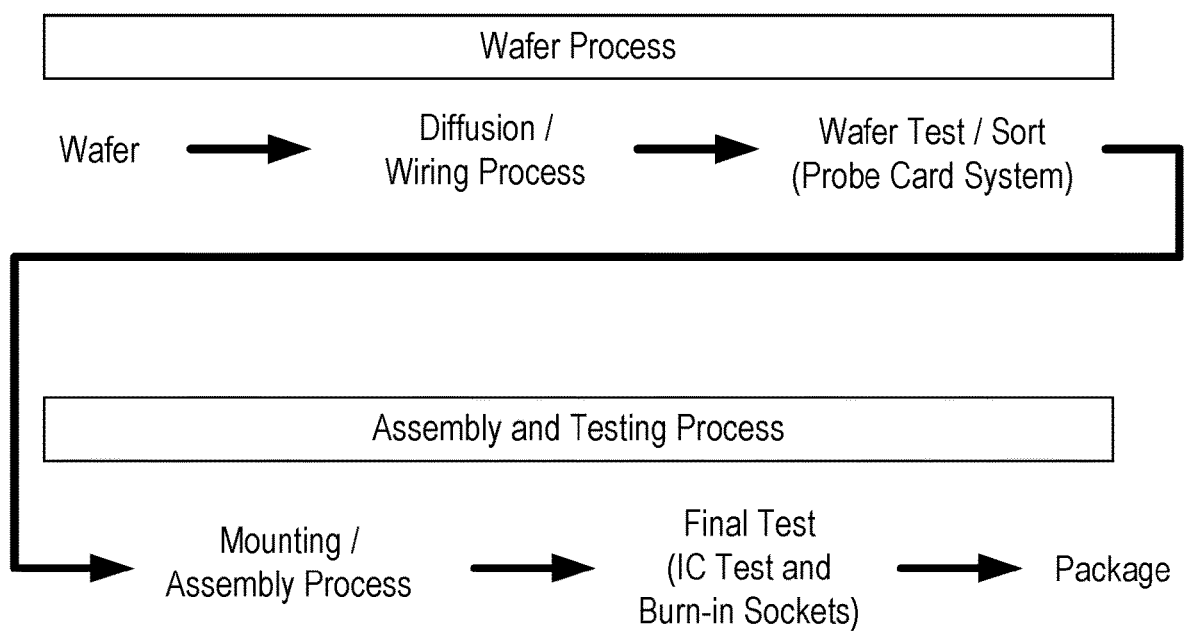
FIG. 2 illustrates a typical IC test flow.

FIG. 2 illustrates a typical IC test flow. Following IC fabrication, the devices are typically subjected to standard parametric and functional tests at wafer test (or wafer sort), followed by assembling the fully functional devices in packages, pre-burn-in package test, burn-in test and final test. The burn-in test stresses packaged ICs by applying high operating temperatures and voltages to accelerate failure mechanisms that cause early field failures. Advanced SiPs require KGDs including fully functional and highly reliable but costly bare dies. Even though the presentation below will be focused on wafer-level test with full-wafer contact, the present disclosure can also be applied to wafer-level burn-in which allows defects to be picked up at early stages (before IC packaging) to save costs. Both wafer-level test and wafer-level burn-in can take advantage of DFT methodology to reduce yield/reliability risks, new product time-to-market and test cost in the face of skyrocketing advanced IC and advanced SiP complexities. When it comes to wafer-level test or wafer-level burn-in, a probe card system for full-wafer contact can be used to access selected groups of the I/O pads of the ICs on the wafer, which, in turn, is electrically connected to a probe station as a part of a wafer test system.

Figure 3A:
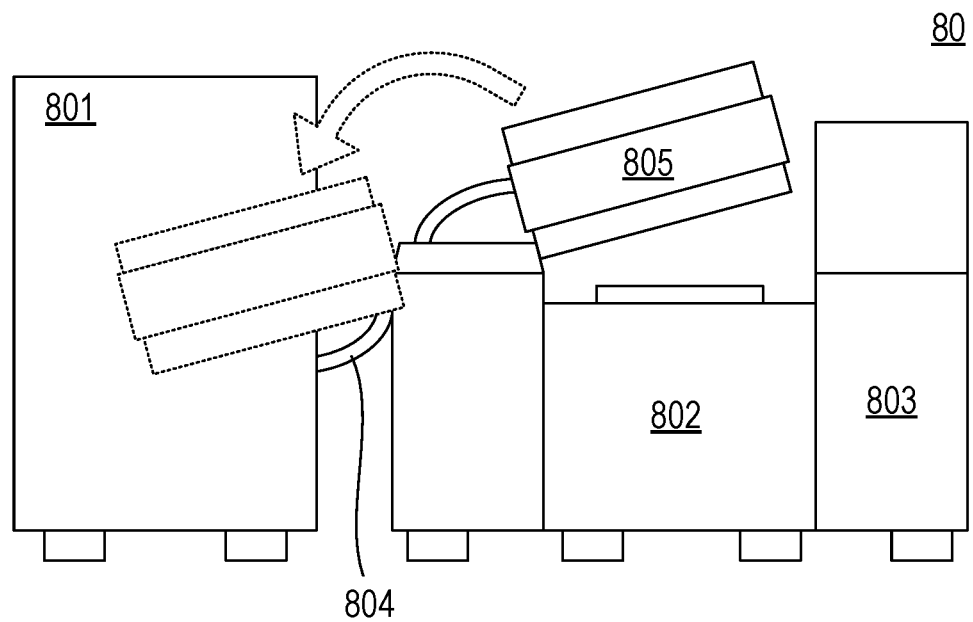
FIG. 3A illustrates a typical wafer test station operated under mechanical actuation.

Wafer test system is a system providing special test patterns (e.g., electrical signals) to devices at wafer level to test for functional defects. As shown in FIG. 3A, a wafer test system 80 includes a tester 801, a measurement and stage travel part 802, and a wafer handling part 803. The tester 801 is connected to the measurement and stage travel part 802 through a data network connection such as a cable 804. Through the cable 804 and the test head 805, the tester 801 provides special test patterns to test a wafer or device disposed on the stage travel part 802. The test head 805, which carries a probe card or a probing sub-system with precision formed probe tips, employs mechanical actuation to position and touch down probe tips to the I/O pads of the device under test (or the wafer under test) to establish electrical connections, and the circuitry on the probe card to route the connections to a test sub-system.

Figure 3B:
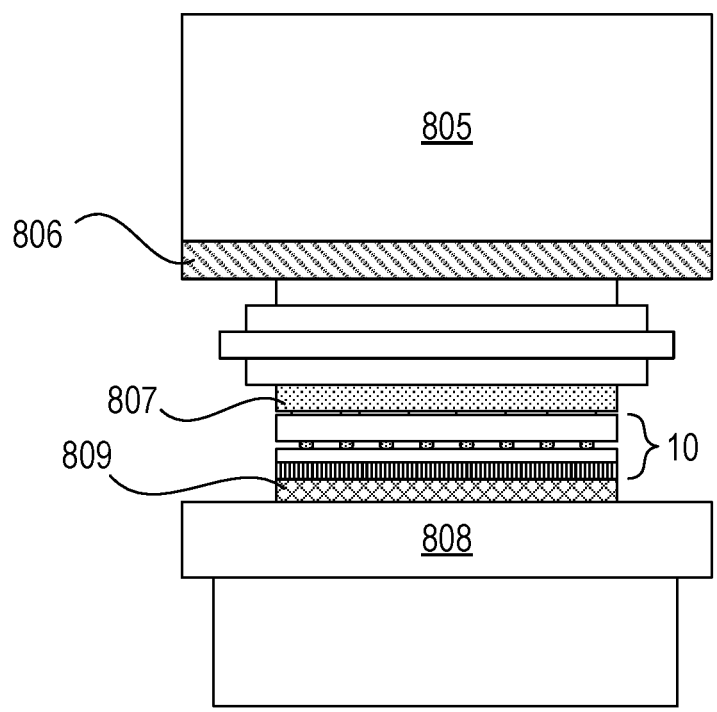
FIG. 3B illustrates an enlarged, cross-sectional view of the test head, the probe card system, and the wafer under test of the wafer test station in FIG. 3A.

FIG. 3B illustrates an enlarged, cross-sectional view of the test head, the probe card system, and the wafer under test of the wafer test station in FIG. 3A. Referring to FIG. 3B, a performance board 806 and a tester interface 807 are in connection with a probe card system 10. The probe card system probes test a wafer 809, or any device in wafer form with the wafer vacuum mounted on a wafer chuck 808. Normally the wafer chuck 808 can be mounted on a precision XY table that provides accurate movement. When a device (or more than one device) on the wafer 809 is powered, the wafer test system 80 uses the results and software to determine if the IC passes or fails the test. Each probe card can measure multiple dies at one touch-down. A wafer-level probe card system as disclosed herein uses one touch-down to contact all pads on the wafer to avoid damages created by multiple touch-downs to delicate, ultra-fine-pitch structures. Following this, wafer test can proceed.

Every wafer test touch-down of the probe card to the I/O pads requires a good electrical contact between the probe tips of the probe card system and the I/O pads. Up until now, mechanical actuation by the test head 805 shown in FIG. 3A and FIG. 3B is the only means employed to create the physical contact between the probe tips and the I/O pads that enables the electrical connection for transmitting power and signals to the device(s) under test. As the numbers of I/Os grow exponentially at ever-finer-pitches for advanced ICs (and advanced wafer-level packaging components) and as the micro-bumps or metal pads grow ever-tinier (e.g., sub-10 µm sizes), it is becoming a daunting task to continue to rely solely on the macroscopic mechanical actuation to bring the ever-tinier microscopic probe tips at ever higher numbers into contact with ever-tinier bumps or pads at ever-higher numbers while ensuring uniform, consistent, non-excessive contact with no damage to both the microscopic probe tips and the pads being probed. Traditional probe cards based on, for instance, cantilever/epoxy and blade (involving higher thermal expansion coefficients compared to silicon) are not suitable for ultrafine-pitch and ultrahigh-I/O applications due to their limitations in the number of probe tips/needles, probe tip numbers and densities, pressure uniformity and planarity.

The present disclosure discloses use of a full-wafer-sized probe card which allows probing of ICs on the entire wafer at one touch-down to minimize damages to large thin multiple dies (or wafer-level packaging components) on wafer as opposed to multiple touch-downs required by the conventional probe cards. The present disclosure also discloses a probe card-WUT engagement approach different from conventional mechanical actuation by utilizing adhesion bonding or direct bonding forces to bring probe tips on a full-wafer-sized interposer into contact with the I/O pads of the ICs on WUT. Compared to mechanical actuation, adhesion or direct bonding provides far more uniform and consistent contact forces across the full wafer involving tiny probes and pads compared to mechanical actuation, and is more scalable to ever-finer pitches, moving forward. Furthermore, the probe card-WUT engagement approach described herein is capable of contacting die pin/pad and location simultaneously on an entire wafer and perform the defined tests and burn-in stresses by die block partitioning or other means.

Figure 4A:
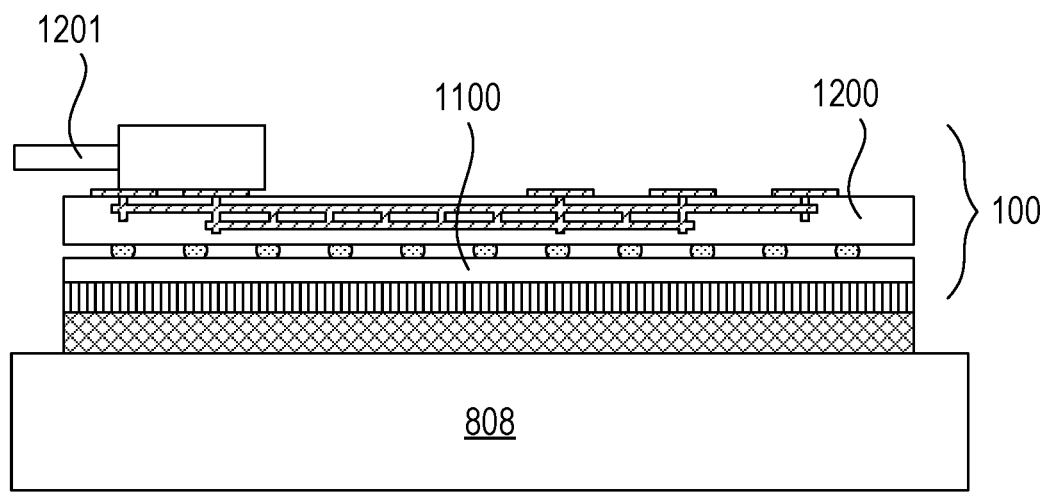
FIG. 4A illustrates a cross-sectional view of a full-wafer probe card system, according to some embodiments of the present disclosure.

Referring to FIG. 4A, a probe card system 100 in some embodiments of the present disclosure includes an interposer 1100 and a tester assembly 1200 configured to be bonded with the interposer 1100. The tester assembly 1200 includes circuitries to route the connections to a tester interface 1201 and a test system (not shown in FIG. 4A).

Figure 4B:
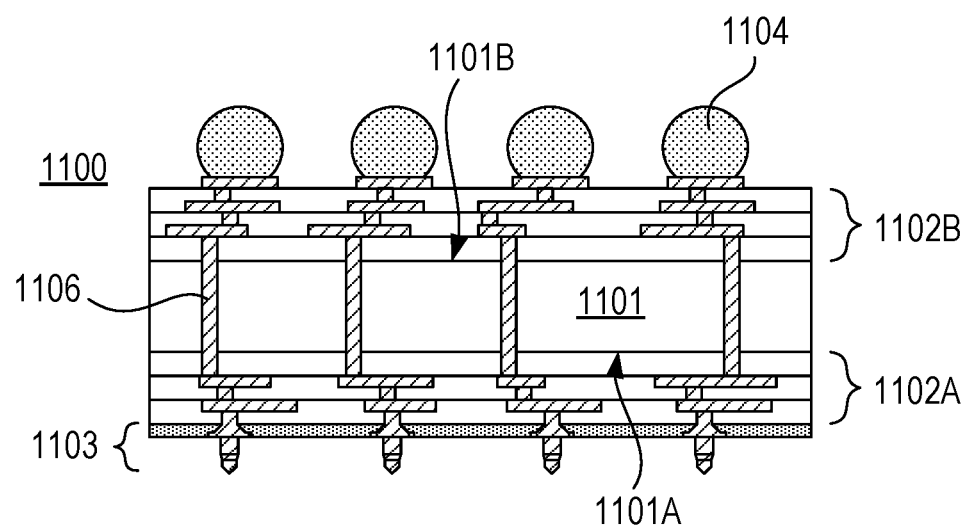
FIG. 4B illustrates an enlarged cross-sectional view of the interposer of the full-wafer probe card system in FIG. 4A, according to some embodiments of the present disclosure.

FIG. 4B illustrates an enlarged cross-sectional view of the interposer 1100 of the full-wafer probe card system in FIG. 4A, according to some embodiments of the present disclosure. The interposer 1100 includes a probe head body 1101, a first interconnection structure 1102A on a first side 1101A of the probe head body 1101, and a second interconnection structure 1102B on a second side 1101B of the probe head body 1101. In some embodiments, the first and second interconnect structures 1102A, 1102B can serve the purpose of an RDL that includes built-in redundancies for example to allow different probe layer structures 1103 and different types of probe tips to be built on the RDL for probing of different ICs using the same common interposer platform. The first interconnection structure 1102A and the second interconnection structure 1102B are electrically connected through a plurality of through vias 1106 penetrating the probe head body 1101. The through vias 1106 can be TSVs or through glass vias (TGVs), depending on the material of the probe head body 1101. The interposer 1100 further includes a probe layer structure 1103 attached to the first interconnection structure 1102A that is on the first side 1101A of the probe head body 1101. The probe layer structure 1103 is configured to engage with a wafer under test (WUT).

The interposer 1100 can be based on silicon, glass, diamond, or silicon-diamond composite wafers. When needed, mechanical actuation can be used in conjunction with adhesive or direct bonding approaches described herein. The interposer 1100 can be made of a suitable probe head body material that possesses a coefficient of thermal expansion (CTE) closely matched to that of the WUT (for example, a silicon wafer or a wafer based on other materials), an attribute required for improved probe tip-to-pad alignment in comparison to PCB or membrane-based probe cards. Depending on their chemical compositions, glass interposer substrates can have a CTE ranging between 3 and 10 ppm/° C., whereas silicon has a CTE of about 3 ppm/° C., diamond has a CTE of about 1 ppm/° C., and PCB has a CTE of 17 to 18 ppm/° C. in the XY plane, with even larger values in the thickness direction. The recent demonstrations of the grown diamond industry in growing larger, higher-quality electronic-grade diamond films (typically through microwave plasma chemical vapor deposition (MPCVD) present an excellent opportunity for the implementation of diamond (both polycrystalline diamond (PCD), and single-crystal diamond (SCD)) and diamond-silicon and other types of diamond-based composite wafers to create a new breed of interposers for wafer-level testing and burn-in. These interposers can take advantage of diamond's extreme properties, such as its exceptional thermal conductivity (about 20-24 W/cm K) which is more than 5 times that of copper, its remarkably high breakdown field (about 20 MV/cm), and its extremely low thermal expansion coefficient (about 1 ppm/° C. at room temperature). Notably, diamond has the highest thermal conductivity among all known materials at temperatures above about 100K, surpassing copper by more than 5 times.

Still referring to FIG. 4B, a probe layer structure 1103 on the interposer 1100 can employ copper for electrical wiring and connection, and a polymer dielectric material (such as a polyimide) or an inorganic dielectric material (such as silicon dioxide ($SiO_2$)) commonly used in wafer back-end-of-the-line (BEOL) and advanced SiP related wafer-level processing. In addition, the interposer 1100 can contain solder bumps 1104 at the second side 1101B of the probe head body 1101 that routes the testing signal to and from the tester assembly 1200, as shown in FIG. 4A, through the second interconnect structure 1102B.

Even though the examples to be provided for demonstration are based on interposers with electrical wiring and TSVs (used synonymously for non-silicon interposers), the processes and structures disclosed in the present disclosure can be extended to glass interposers, diamond interposers, and interposers containing optical wiring/wave guides, optical TSVs, and single-mode fiber array/couplers for probing involving optical interconnects. While electrical through vias 1106 enable power and signal delivery from the PCB assembly and the interposer 1100, optical through vias in the interposer 1100 can provide ultrahigh bandwidth communications. Besides electrical and optical through vias, the interposer 1100 can also contains fluidic channels to allow coolant liquid to pass through the interposer 1100 for enhanced thermal management during wafer test or burn-in procedures, as exemplified in FIG. 5A, FIG. 5B, FIG. 6A, and FIG. 6B.

Figure 5A:
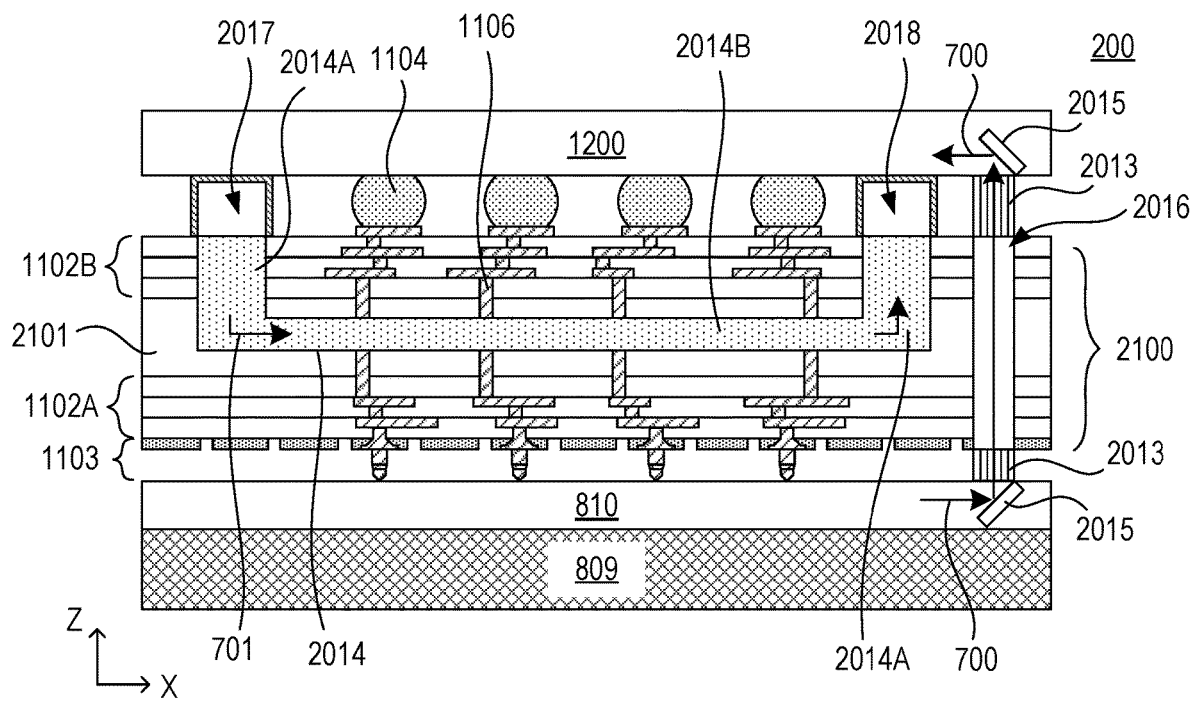
FIG. 5A illustrates a cross-sectional view of a full-wafer probe card system, according to some embodiments of the present disclosure.

Referring to FIG. 5A, a probe card system 200 in some embodiments of the present disclosure includes one or more optical components in at least one of the probe head body 2101, the first interconnection structure 1102A, the second interconnection structure 1102B, or the probe layer structure 1103. In FIG. 5A, two optical adapters 2013 can be positioned at two sides of the interposer 2100 and connected to an optical waveguide 2016 connecting the two sides of the interposer 2100. In some embodiments, the optical waveguide 2016 passes through the first interconnection structure 1102A, the probe head body 2101, and the second interconnection structure 1102B.

By integrating optical components in the interposer 2100, an optical signal 700 propagating through a circuit layer 810 of the WUT 809 is re-directed by the reflectors 2015 to enter the optical waveguide 2016 and reach the tester assembly 1200. Other optical components may be used (not illustrated herein) includes, but no limited to, single-mode or multimode fiber arrays or couplers, optical transceivers, optical-electronic converters, etc. The optical signal 700 can be transmitted back and forth from the WUT 809 to the tester assembly 1200 to complete the optical probing or testing. This configuration enables ultrahigh bandwidth communications to be achieved through such probe card system that incorporates interposers containing optical structures for probing with optical interconnects.

Still referring to FIG. 5A, the interposer 2100 can include one or more fluidic channels 2014 composed of, for example, two vertical sections 2014A and a horizontal section 2014B connecting two vertical sections 2014A in the probe head body 2101 and the second interconnect structure 1102B. The fluidic channel 2014 is coupled with a coolant inlet 2017 and a coolant outlet 2018, each residing at a side of the interposer 2100. Such arrangement facilitates thermal management during testing or burn-in procedures by flowing a coolant or a liquid 701 at a selected temperature through the fluidic channels 2014 in the probe card system 200 and a heat exchanger outside the probe card system 200.

Figure 5B:
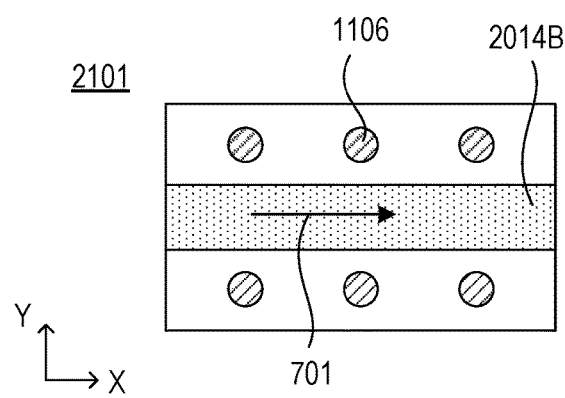
FIG. 5B illustrates a top view dissecting from a planar level of a fluidic channel of the full-wafer probe card system in FIG. 5A, according to some embodiments of the present disclosure.

FIG. 5B illustrates a top view dissecting from a horizontal section 2014B of a fluidic channel 2014 of the full-wafer probe card system in FIG. 5A, according to some embodiments of the present disclosure. As shown in FIG. 5B, the horizontal section 2014B of a fluidic channel 2014 is located in areas without and isolated from the through vias 1106 for power and signaling. In other words, the electrical components in the interposer 2100 are isolated from the liquid 701 running through the interposer 2100, preventing direct contact of the coolant liquid 701 and the through vias 1106.

Figure 6A:
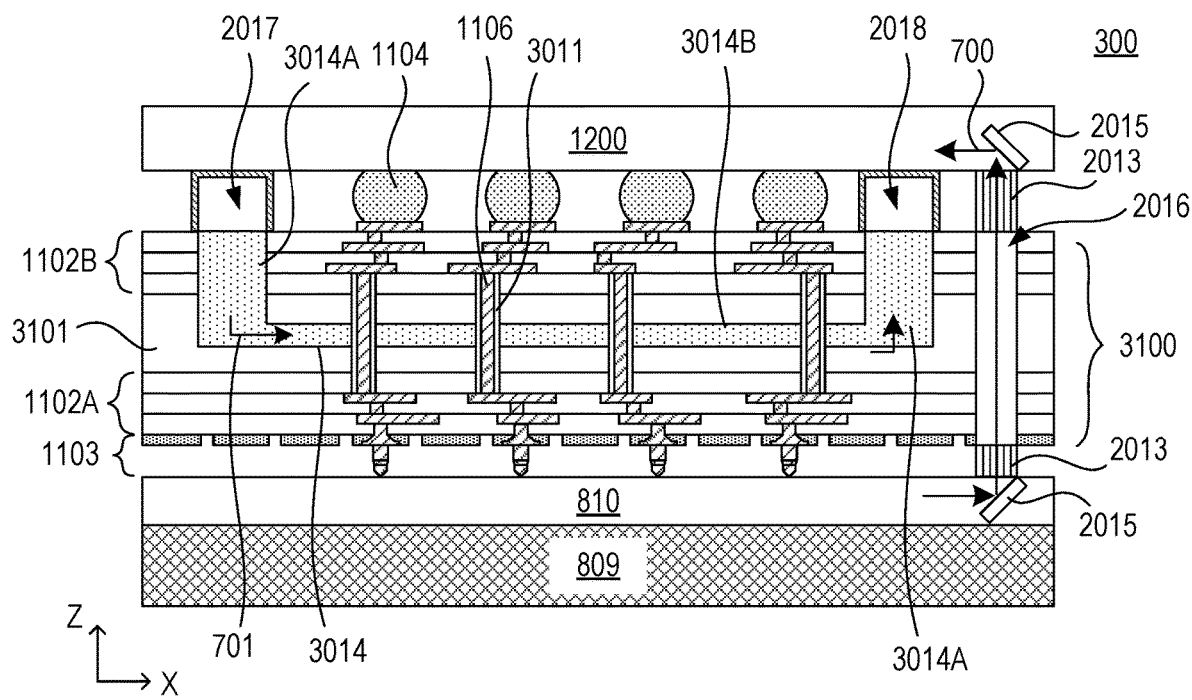
FIG. 6A illustrates a cross-sectional view of a full-wafer probe card system, according to some embodiments of the present disclosure.
Figure 6B:
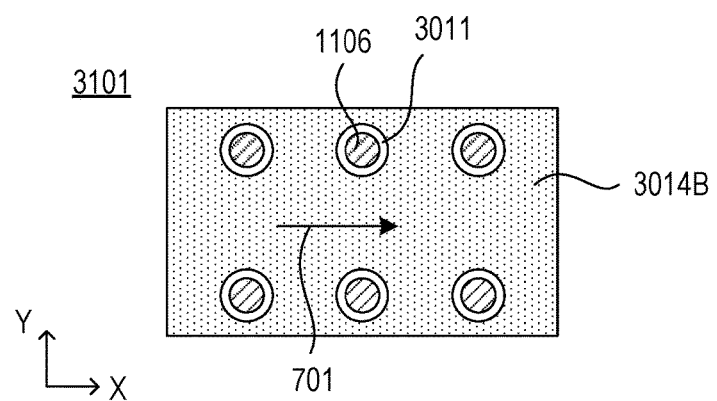
FIG. 6B illustrates a top view dissecting from a planar level of a fluidic channel of the full-wafer probe card system in FIG. 6A, according to some embodiments of the present disclosure.

Alternatively, in other embodiments, the approach for preventing the contact of the coolant liquid 701 and the electrical through vias 1106 can be modified for enhanced thermal management, as shown in FIGS. 6A and 6B. Identical numerals in FIGS. 5A, 5B, 6A, and 6B refer to identical or equivalent structures and are not repeated here for brevity. In a probe card system 300 shown in FIG. 6A, the interposer 3100 can include one or more fluidic channels 3014 composed of, for example, two vertical sections 3014A and a horizontal section 3014B connecting the two vertical sections 3014A in the probe head body 3101 and the second interconnect structure 1102B. The plurality of electrical through vias 1106 are laterally surrounded by an insulating layer 3011 with the liquid 701 flowing in close proximity to these vias.

FIG. 6B illustrates a top view dissecting a horizontal section 3014B of a fluidic channel 3014 of the full-wafer probe card system in FIG. 6A, according to some embodiments of the present disclosure. The extra insulating layer 3011 surrounding the electrical through vias 1106 allows these through vias 1106 to be located in the horizontal section 3014B of the fluidic channel 3014 and be isolated from the fluidic channels. Because the space occupied by the vertical sections 3014A and the horizontal section 3014B of the fluidic channel 3014 is greater than that of the vertical sections 2014A and the horizontal section 2014B of the fluidic channel 2014 in FIG. 5B, a thickness of the horizontal section 3014B can be thinner than that of the horizontal section 2014B to achieve a similar effect of probe card system cooling. As described hereinafter, the temperature of the probe layer structure can be controlled by the cooling structure described herein in order to reach a temperature low enough to avoid creation of a permanent bond during a direct bonding probe card-WUT engagement process.

FIGS. 7A to 9B illustrate three different examples of the probe layer structures 1103 in some embodiments of the present disclosure. The probe layer structures 1103 described herein includes at least a sacrificial layer and a bonding layer. For full-wafer probing, the sacrificial layer in the probe layer structures 1103 enables lift-off of the probe layer structure containing the probe tips after many uses, and recreation of a new probe layer structures 1103 such that the interposer can be reused. The bonding layer on the very top of the probe layer structure 1103 can be based on a dielectric such as silicon dioxide ($SiO_2$) or a polymer such as a fully cured polyimide (PI), both of which are commonly used in wafer back-end-of-the-line (BEOL) and advanced SiP processing. In some embodiments, an optional compliant layer in the probe layer structure helps preserve the integrity of the probe structure underneath the probe tips.

Figure 7A:
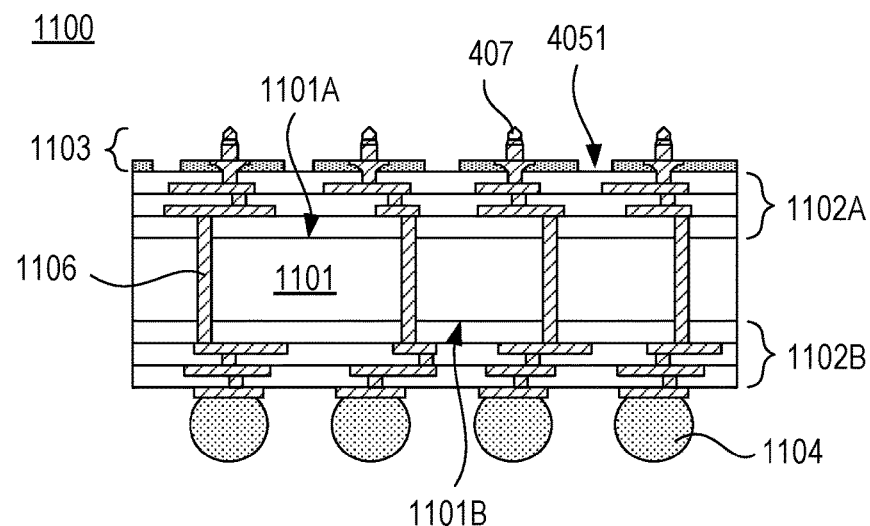
FIG. 7A illustrates a cross-sectional view of a probe layer structure, according to some embodiments of the present disclosure.
Figure 7B:
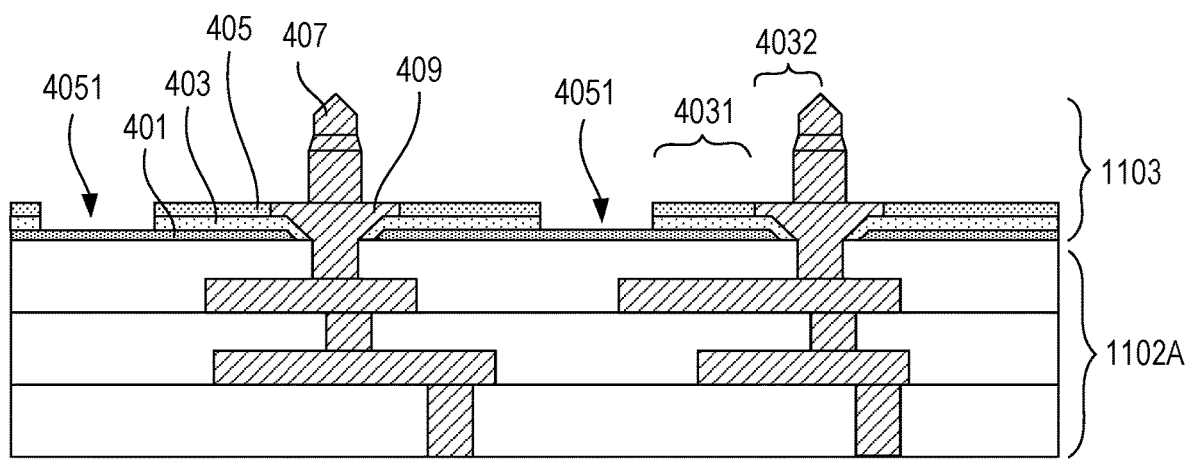
FIG. 7B illustrates an enlarged cross-sectional view of the probe layer structure in FIG. 7A, according to some embodiments of the present disclosure.

Identical numerals in FIGS. 4B, 7A, and 7B refer to identical or equivalent structures and are not repeated here for brevity. FIG. 7B illustrates an enlarged cross-sectional view of the probe layer structure in FIG. 7A, according to some embodiments of the present disclosure. In FIG. 7B, a sacrificial layer 401 is in connection with the first interconnect structure 1102A, a bonding layer 405 is stacked over the sacrificial layer 401, and a plurality of probe tips 407 each is in connection with respective conductive patterns 409 exposed from the bonding layer 405 and electrically coupled to the first interconnection structure 1102A. In the embodiment that the optional compliant layer 403 is included in the probe layer structure 1103, as illustrated in FIG. 7B, the complaint layer 403 is disposed in between the sacrificial layer 401 and the bonding layer 405, and can be composed of elastomers. In some embodiments, a first portion 4031 of the complaint layer 403 is located between the sacrificial layer 401 and the bonding layer 405, and a second portion 4032 of the compliant layer 403 is located between the sacrificial layer 401 and the respective conductive patterns 409 of the probe layer structure 1103.

The bonding layer 405 serves the purpose of an engagement layer with the WUT, for example, through PI-to-PI or oxide-to-oxide direct bonding or through a release/adhesive layer for adhesion bonding, enabling the probe card system to be used interchangeably for WUT involving adhesion and direct bonding. The bonding layer 405 typically includes polymer, such as a fully cured PI, which is commonly found in advanced packaging and IC passivation other and an inorganic layer like $SiO_2$ which again is commonly used in advanced packaging and for IC pas sivation.

The sacrificial layer 401 can be made of a combination of metal and non-metal materials. Possible metal options are nickel (Ni), chromium (Cr), titanium (Ti), copper (Cu), manganese (Mn), iron (Fe), cobalt (Co), tungsten (W), molybdenum (Mo), and tantalum (Ta), while non-metal options can consist of oxides, phosphates, and chromates of these metals. Some preferred mixtures include chromium and chromium oxide, as well as nickel and nickel oxide. In some embodiments, the sacrificial layer 401 can be made of an etchable metal, an etchable non-metal, or a combination thereof. Additionally, a wide range of sacrificial layer 401 commonly utilized in MEMS processing can be considered, such as metallic materials like Cu, aluminum (Al), Ti, and Cr, as well as non-metallic materials like silicon dioxide, poly-silicon, and polymers such as poly (methyl methacrylate) (PMMA), polyimide, and photoresists (including photosensitive polyimides). It is worth noting that the sacrificial layer 401 can be relatively thin, measuring less than 0.3 µm in thickness. In some embodiments, chromium oxide ($Cr_2O_3$) possesses several desirable attributes as the sacrificial layer 401. For example, it can be sputter deposited to generate stress-controlled films with a thickness of several hundred nanometers. Furthermore, chromium oxide exhibits strong adhesion to both dielectric and metal surfaces, shows resistance to a wide range of acids and bases, undergoes rapid etching in standard chromium etchants, and exhibits minimal reactivity with commonly used materials, even at high temperatures. There exist various methods to form the sacrificial layer 401, including vapor deposition, sputtering, electroplating, and immersion plating.

In some embodiments, the probe layer structure 1103 in FIG. 7B includes a plurality of through holes 4051 in the bonding layer 405 and in the optional compliant layer 403. These through holes 4051 can expose the sacrificial layer 401 underlying the bonding layer 405 and the optional compliant layer 403 to the etchant to facilitate the sacrificial layer 401 removal.

Depending on the shapes and structures of the probe tips, as well as the contact forces applied during wafer-level probing, a compliant layer 403 can be incorporated into the probe layer structure in close proximity to the probe tips. This helps minimize thermo-mechanical impacts on both the probe card and the WUT, while also extending the lifespan of the probe card system. The compliant layer 403, if used, can be constructed using elastomers such as polydimethylsiloxane (PDMS), which can be spin coated, cured, and patterned onto the interposer. Polymers like polyimide and PDMS can be micromachined through photolithography or laser techniques. By optimizing the pulse duration, repetition rate, and number of shots using ultra-short laser pulses, micro-through-holes with sub-10 μm diameters can be created in polyimide (PI) with minimal thermal damage when the pulse duration is shorter than 140 femtoseconds. In some embodiments, a suitable short-pulse laser source could be a mode-locked oscillator and regenerative amplifier equipped with Ti:Sapphire (such as Mira900/RegA900 from Coherent) operating at a wavelength of 800 nm.

Figure 8A:
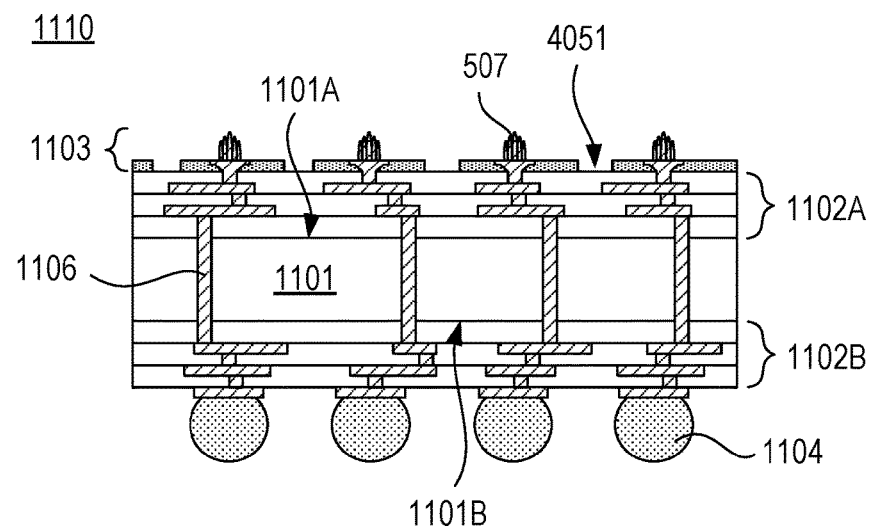
FIG. 8A illustrates a cross-sectional view of a probe layer structure, according to some embodiments of the present disclosure.
Figure 8B:
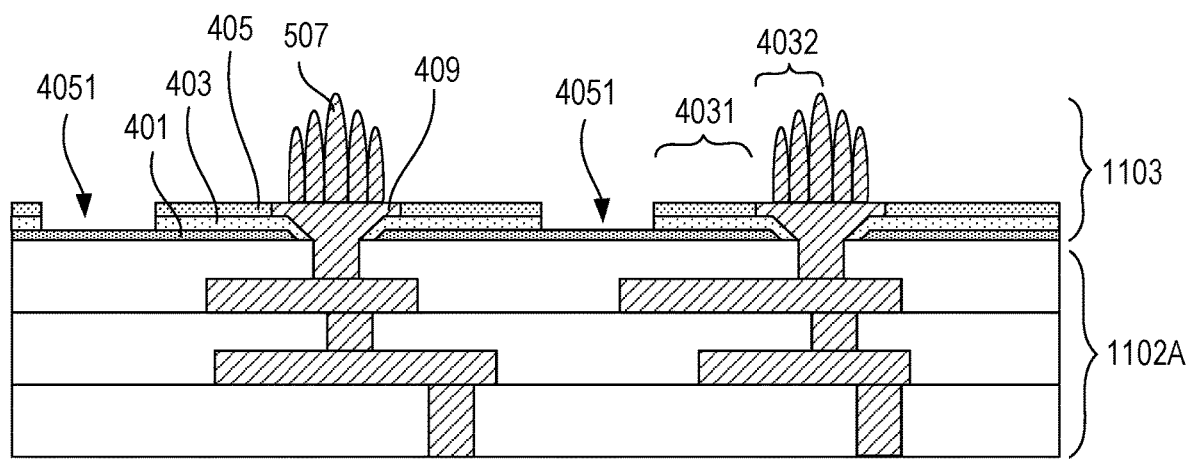
FIG. 8B illustrates an enlarged cross-sectional view of the probe layer structure in FIG. 8A, according to some embodiments of the present disclosure.
Figure 9A:
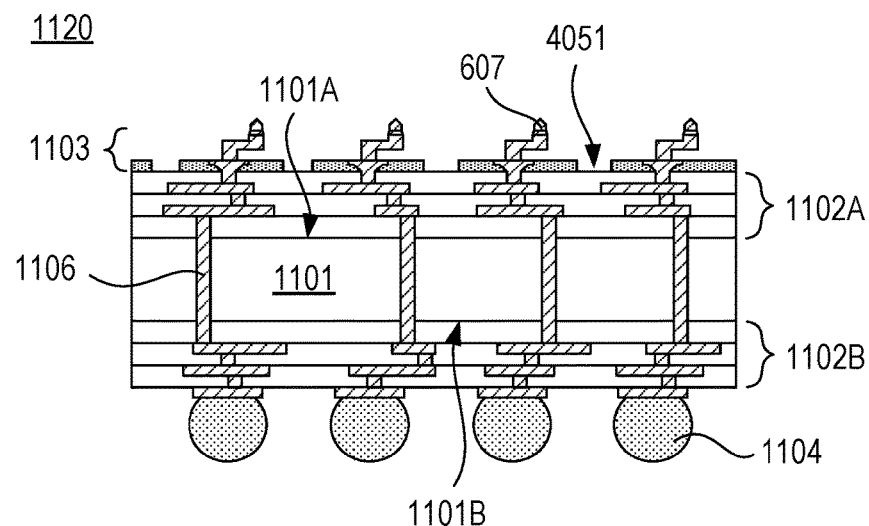
FIG. 9A illustrates a cross-sectional view of a probe layer structure, according to some embodiments of the present disclosure.
Figure 9B:
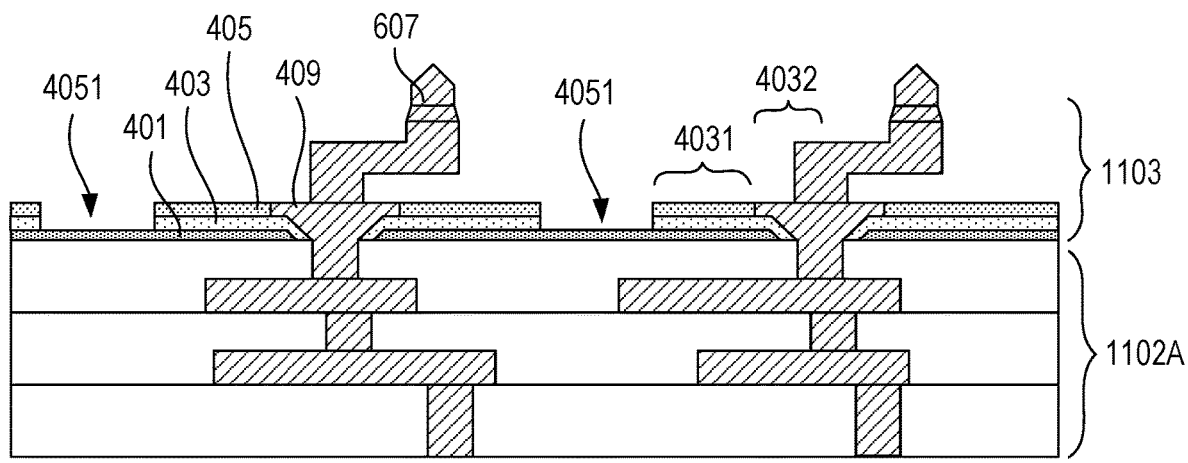
FIG. 9B illustrates an enlarged cross-sectional view of the probe layer structure in FIG. 9A, according to some embodiments of the present disclosure.

Identical numerals in FIGS. 7A, 7B, 8A, 8B, 9A, and 9B refer to identical or equivalent structures and are not repeated here for brevity. The interposer 1110 in FIG. 8A and the interposer 1120 in FIG. 9A are substantially identical to that in FIG. 7A, except for the profiles of the probe tips. Generally, the probe tips are designed to deflect and scrub against micro-bumps or metal pads upon contact. As illustrated in the figures, the probe tip 407 in FIG. 7B is of a vertical needle shape tip while the probe tip 507 in FIG. 8B is a dendritic tip comprising a plurality of dendrites such as electroplated palladium dendrites where hard palladium dendrites can penetrate softer micro-bumps or solder bumps at room temperature or low temperatures to establish electrical connections during full-wafer test, and can be subsequently separated or disconnected when the micro-bumps or solder bumps. The probe tip 607 in FIG. 9B is a micro-cantilever tip or a spring loaded probe tip that can deflect and provide gentle scrub at the micro-bumps or metal pads at touch-down. Other than the vertical needle tip, the dendritic tip, and the micro-cantilever tip, the probe tips can also assume the shape of a pyramid or a combination of the aforementioned shapes. In some embodiments, a minimal pitch of the plurality of probe tips 407, 507, or 607 is smaller than 40 μm covering an area of the probe layer structure 1103 comparable to an area of the WUT.

To achieve high-yielding wafer testing, formation of cupric oxides on copper pads (when copper pads are probe tested; which is not an issue with probing pads deposited with solder bumps) is one of the issues to be considered when designing suitable forms of probe tips (and pre-test wafer cleaning as needed). Accordingly, in some embodiments, a non-oxidizing probe metallurgy can be use. This may help in scrubbing through oxide layers on the copper pads and prevent the probes from sticking. By using the non-oxidizing probe metallurgy, the contact between the probes and the pads remains stable and avoids any unwanted adhesion. In some embodiments, a suitable probe geometry and tip shape can be employed. The probe geometry and tip shape should allow for adequate scrubbing action while achieving optimal over-travel. In some embodiments, the cleaning recipe can be optimized to remove any oxides, contaminants or residues that may hinder proper electrical contact.

In some embodiments, the various forms of probe tips can be combined with each other in a single interposer. The conductive metal of the probe tips, as depicted in FIGS. 7A to 9B, can be fabricated using materials such as Cu, W, Ni—Co, Ni-boron (B), Ni/Ni—W, or other conductive materials commonly employed in the industry. These metal probe tips with different forms can be accompanied by surface coatings (e.g., PdCo) for improved performance.

For higher-frequency RF applications, advanced probe card designs should consider impedance control for supply and transmission lines. Additionally, these designs should address probe inductance and incorporate short probe tips to meet the specific requirements of such applications.

The embodiments depicted in FIGS. 7A to 9B are not drawn to scale. The sacrificial layer 401 can have a thickness on the order of hundreds of nanometers, while the bonding layer 405 can be less than 1 μm thick. When required, the complaint layer 403 can also be thin and positioned in close proximity to and beneath the probe tips 407, 507, 607. Furthermore, the implementation of elastomers to form the compliant layer 403 enables the application of higher contact forces to break oxide layers on IC pads and probe tips while minimizing damage to the underlying structures.

Figure 10A:
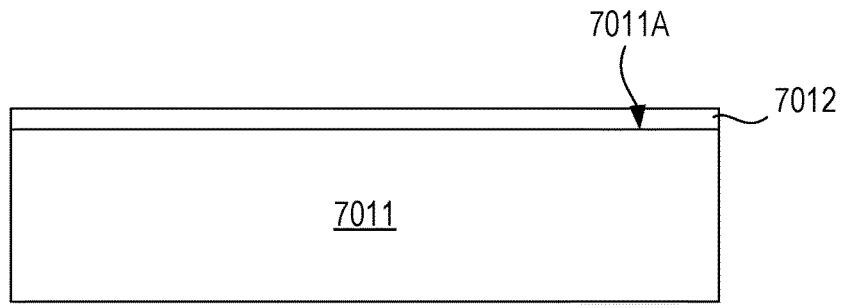
FIG. 10A to FIG. 10G illustrate operations for forming a plurality of probe tips on an interposer, according to some embodiments of the present disclosure.
Figure 10B:
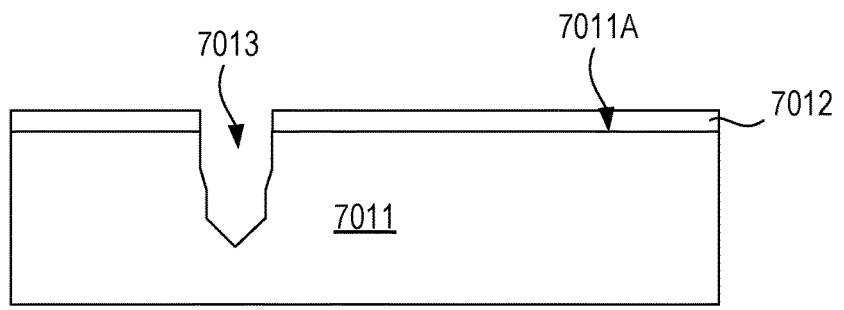
Figure 10C:
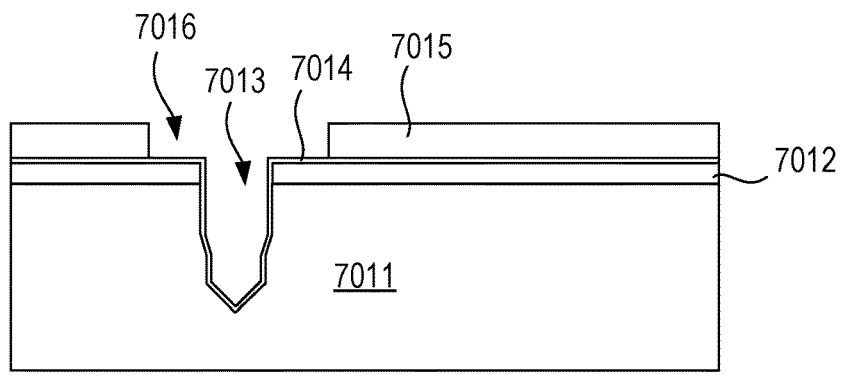
Figure 10D:
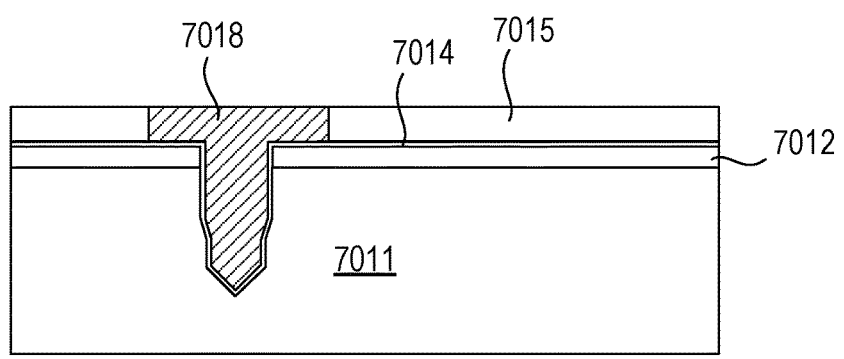

FIG. 10A to FIG. 10G illustrate a method for forming a plurality of probe tips on an interposer. Referring to FIG. 10A, a carrier wafer 7011 having a first surface 7011A to be masked can be received. The carrier wafer 7011 can be a silicon wafer. In some embodiments, a masking film 7012 deposited over the first surface 7011A of the carrier wafer 7011 can include $SiO_2$, $Si_3N_4$, or the like, which can be subsequently patterned for desired openings. As shown in FIG. 10B, a cavity 7013 can be formed in the carrier wafer 7011 from the openings of the masking film 7012. The cavity 7013 can be a tip cavity formed via a silicon etching operation. Next, referring to FIG. 10C, a seed layer 7014 can be sputtered over the interior sidewall of the cavity 7013 and the masking film 7012 on the carrier wafer 7011 Subsequently, a photoresist 7015 is formed and patterned over the seed layer 7014 forming a beam cavity 7016 over the tip cavity 7013 by suitable photolithography operations. As shown in FIG. 10D, a probe tip 7018 can be formed by an electroplating operation filling the tip cavity 7013 and the beam cavity 7016 with suitable conductive material such as copper (Cu).

Figure 10E:
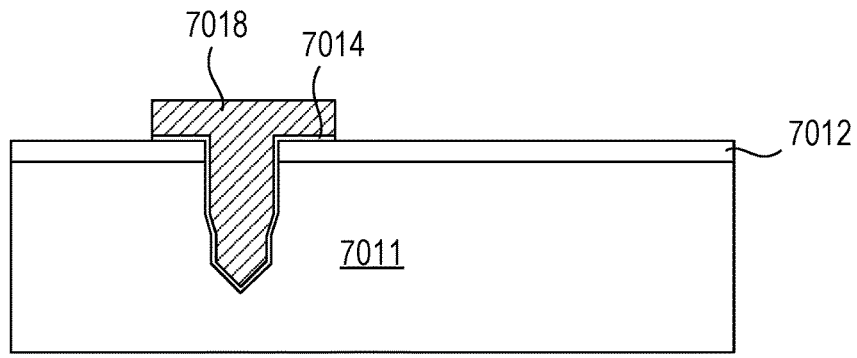

As depicted in FIG. 10E, a photoresist stripping operation can be conducted to remove the photoresist, followed by an etching process to remove a portion of the seed layer 7014 that is exposed from the probe tip 7018. The example in FIGS. 10A to 10E solely utilize a single cavity 7013 to illustrate the operations for forming a probe tip. In fact, multiple cavities 7013 can be created in the carrier wafer 7011 in one operation, allowing for the formation of numerous probe tips simultaneously.

Figure 10F:
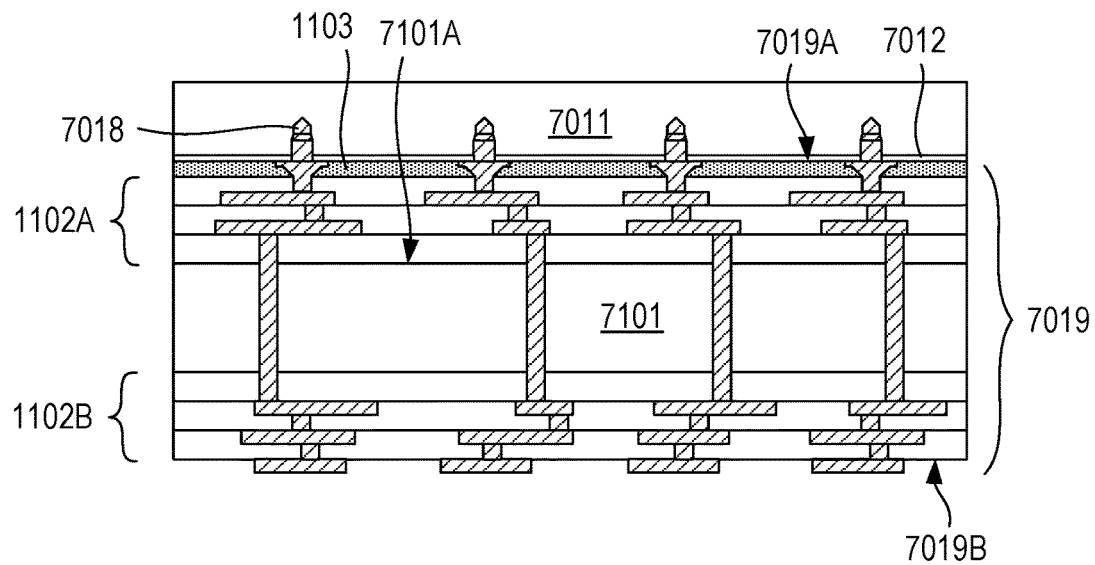
Figure 10G:
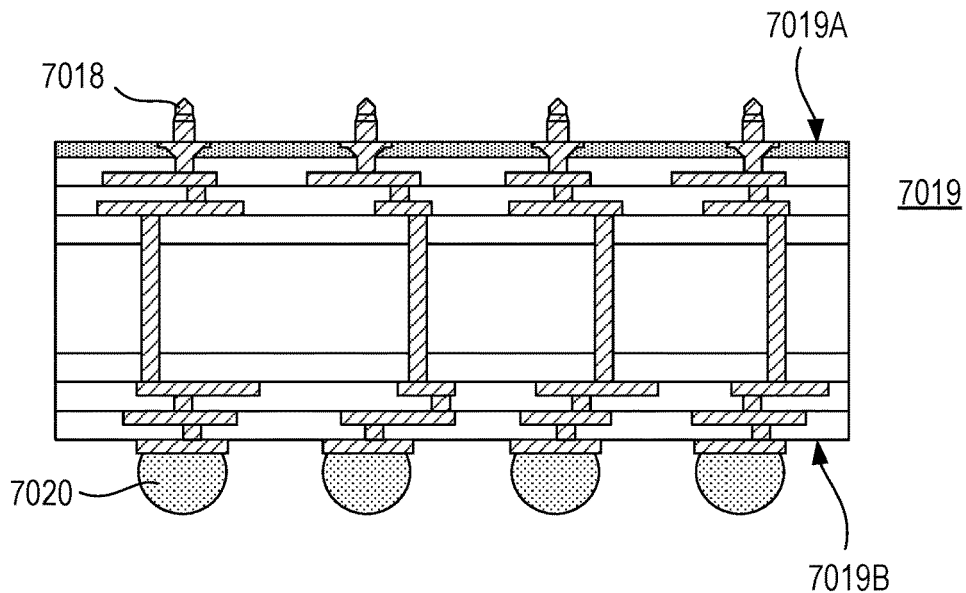

As shown in FIG. 10F, the carrier wafer 7011 supporting the probe tips 7018 can be directly bonded to the first interconnect structure 1102A at the first side 7101A of the probe head body 7101. Alternatively, the carrier wafer 7011 can be attached to a first side 7019A of the interposer 7019 through the use of a suitable bonding material. Referring to FIG. 10G, the carrier wafer is moved through a silicon etch operation, and other exposed layers following the silicon etch can be removed by suitable etching operations. The silicon etch operation may include performing a bulk silicon selective etch. For instance, a hydrofluoric (HF) acid solution or other bulk silicon etching techniques can be employed to selectively remove silicon over the probe tips. Subsequently, one or more solder bumps 7020 can be formed on the second side 7019B of the interposer with the probe tip side of the interposer bonded to a temporary glass carrier using a release layer (such as that commonly used in fan-out processing) to enable external connections.

Referring back to FIGS. 7B, 8B, 9B, prior to the operation of bonding the carrier wafer 7011 to the interposer 7019, the 2-layer or the 3-layer stack of the probe layer structure of the interposer 7019 is formed over the first interconnection structure 1102A, so that probe tips 7018 can be integrated with the 2-layer or the 3-layer probe layer stack to complete the probe layer structure described herein. In some embodiments, the formation of the 2-layer or the 3-layer stack includes the operations such that the sacrificial layer 401 is formed in connection with the first interconnection structure 1102A, the bonding layer 405 is created over the sacrificial layer 401 (2-layer stack), and optionally, the compliant layer 403 is formed between the sacrificial layer 401 and the bonding layer 405 (3-layer stack).

Figure 11A:
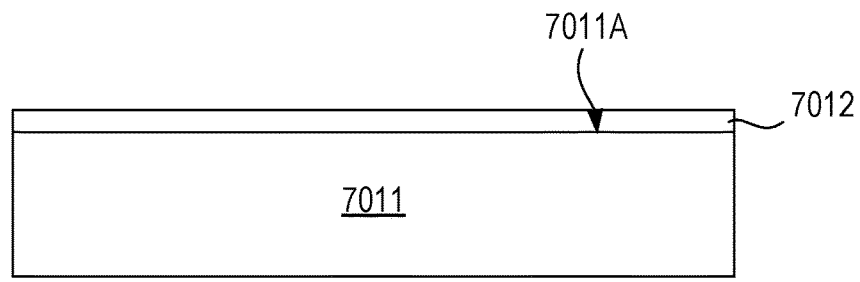
FIG. 11A to FIG. 11G illustrate operations for forming a plurality of probe tips on an interposer, according to some embodiments of the present disclosure.
Figure 11B:
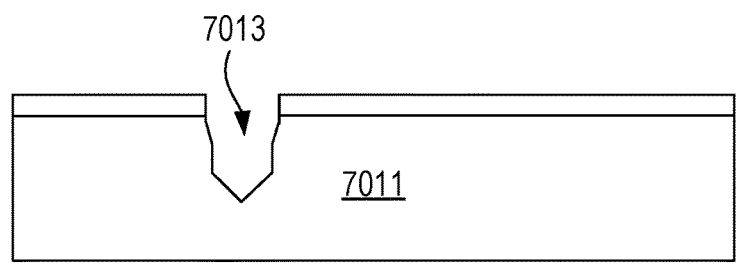
Figure 11C:
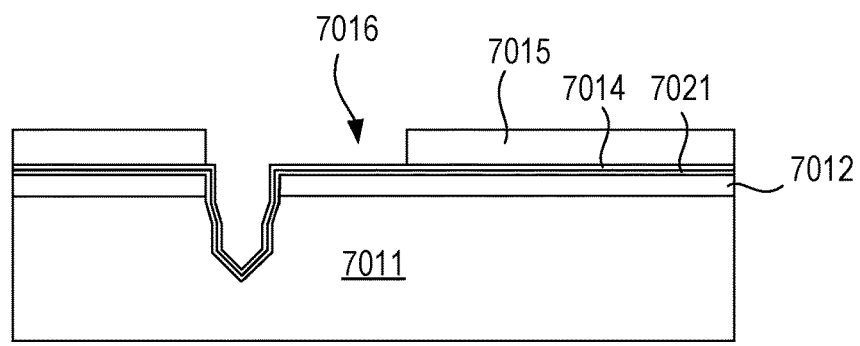
Figure 11D:
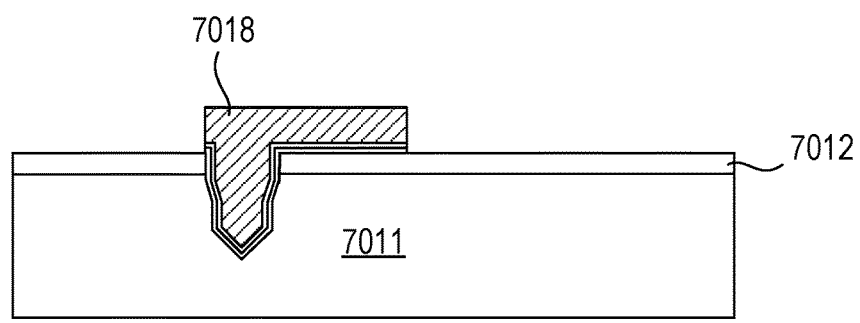
Figure 11E:
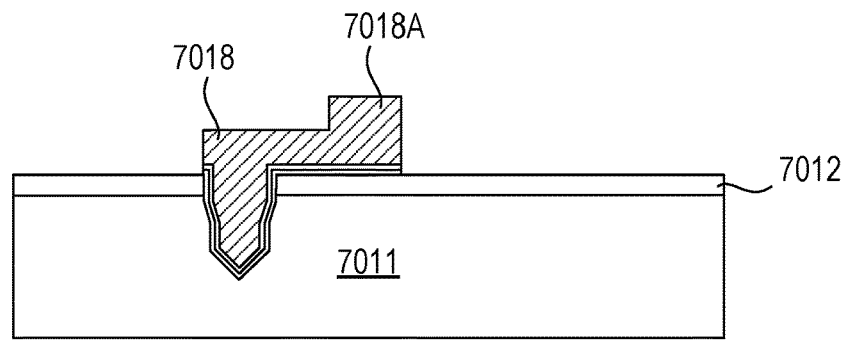

FIGS. 11A to 11G show an example of forming micro-cantilever tips. Identical numerals in FIGS. 10A to 10G, and 11A to 11G refer to identical or equivalent structures and are not repeated here for brevity. The operations in FIGS. 11A to 11G are similar to those in FIGS. 10A to 10G except for the operation in FIG. 11C, an additional sacrificial layer 7021 can be deposited over the masking film 7012 prior to seed layer 7014 deposition. This sacrificial layer 7021 can aid in the electroplating of copper and facilitate the separation of the carrier wafer 7011 from the probe tips. The photoresist 7015 over the seed layer 7014 can be patterned to create a beam cavity 7016 over the tip cavity 7013 by suitable photolithography operations. In FIG. 11D, the tip cavity 7013 and the beam cavity 7016 are filled with a conductive material such as Cu by performing an electroplating operation to form probe tips 7018. By repeating the photolithography and electroplating operations in FIG. 11C and FIG. 11D, one can further build the ledge 7018A over the probe tips7018 and form a cantilever tip or micro-cantilever tip with the ledge 7018A to be bonded to the first interconnect structure 1102A on the first side 7101A of the probe head body 7101.

Figure 11F:
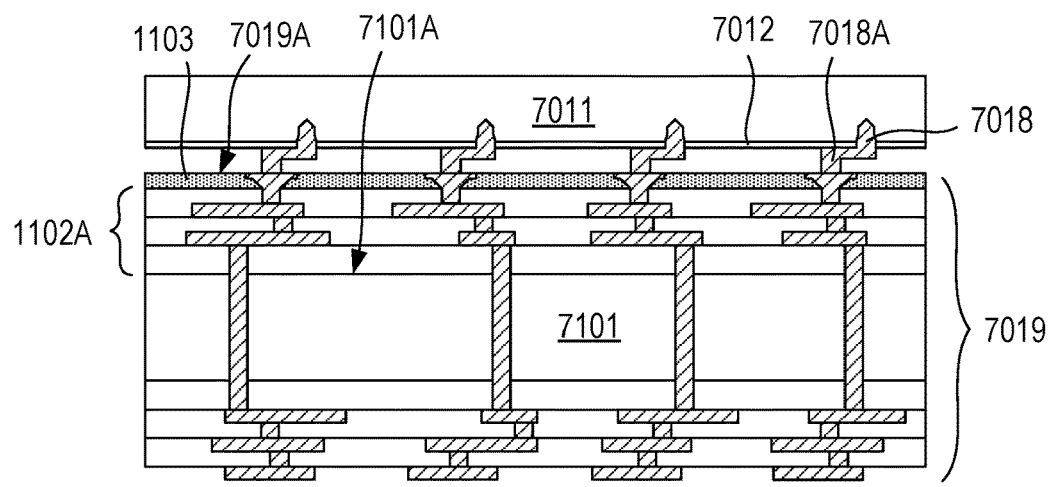
Figure 11G:
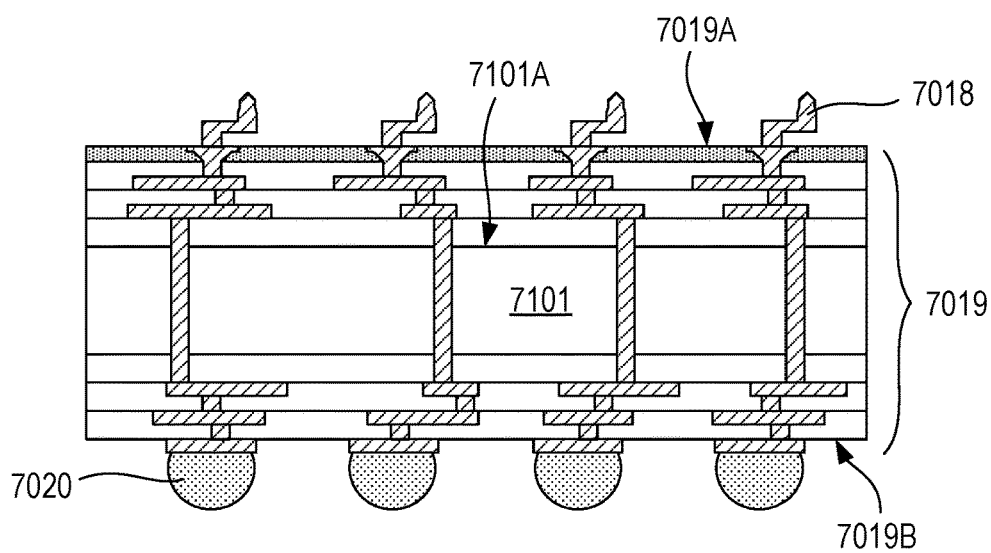

Referring to FIG. 11F, the carrier wafer 7011 carrying the probe tips 7018 with the ledge 7018A can be bonded to the first interconnect structure 1102A at the first side 7101A of the probe head body 7101. Alternatively stated, the carrier wafer 7011 can be bonded to the first side 7019A of the interposer 7019 with the use of a suitable bonding material so as to form electrical connections between probe tips 7018 with the ledge 7018A and the electrical wirings in the first interconnect structure 1102A. Referring to FIG. 11G, the carrier wafer is removed through a silicon etch operation, and other exposed layers following the silicon etch can be removed by suitable etchants. The silicon etch operation may include performing a bulk silicon selective etch. For instance, a hydrofluoric (HF) acid solution or other bulk silicon etching techniques can be employed to selectively remove silicon over the probe tips. The extra sacrificial layer 7021 formed prior to the seed layer 7014 can further facilitate the separation of carrier wafer 7011 from the probe tips 7018. One or more solder bumps 7020 are formed on the second side of the interposer 7019B to enable external connections as in the case of FIG. 10G.

Referring back to FIGS. 7B, 8B, 9B, prior to the operation of bonding the carrier wafer 7011 to the interposer 7019, the 2-layer or the 3-layer probe layer stack of the interposer 7019 is formed over the first interconnection structure 1102A, so that probe tips 7018 with the ledge 7018A can be integrated with the 2-layer or the 3-layer stack to complete the probe layer structure described herein. In some embodiments, the formation of the 2-layer or the 3-layer stack includes the operations such that the sacrificial layer 401 is formed in connection with the first interconnection structure 1102A, the bonding layer 405 is stacked over the sacrificial layer 401 (2-layer stack), and optionally, the compliant layer 403 is formed between the sacrificial layer 401 and the bonding layer 405 (3-layer stack).

There is a plethora of probes that can be manufactured using MEMS or membrane processes, including vertical probes, micro-cantilever probes, torsional probes, and various others. When designing probe tips for a specific application, several crucial parameters need to be taken into consideration. These parameters include the type of pad, pad configuration, die size, pad size (passivation opening and keep-away), pad material, force requirements, scrub depth, frequency/bandwidth, pad density (probes per square millimeter), active area (size of the probe array), and temperature sensitivity. Advanced probe cards must be capable of supporting high-speed testing, cold-and-hot temperature cycle testing, and be able to handle sub-20 μm or smaller pitches.

Two approaches are disclosed to achieve the needed probe card contact forces: adhesion bonding force and direct bonding force, i.e., chemical forces, which can be applied in conjunction with conventional mechanical actuation as needed. Following the deposition and patterning of a release/adhesive layer (which is commonly used in advanced SiP processes, for instance, fan-out processes) on the 2-layer stack or 3-layer stack probe layer structure of a glass interposer, one can bond the glass interposer probe card through the release/adhesive layer to the wafer being probed and achieve probe-to-pad electrical contact at low temperatures. Following wafer testing or burn-in procedures, the interposer/wafer assembly can be illuminated with a laser to release the release/adhesive layer from the glass interposer and separate the wafer from the interposer probe card. In this case, adhesion forces are utilized for the interposer/wafer engagement and disengagement. Another way to apply the contact forces is through direct bonding which is customized with limited heating to exert strong enough, self-aligning forces to achieve electrical contact yet weak enough forces to allow separation of the bonding surfaces and interposer from wafer following full-wafer test. In some embodiments, when the WUT employs $SiO_2$ as the top layer for copper hybrid bonding, the bonding layer on the interposer can accordingly be based on $SiO_2$. Correspondingly, when the wafer incorporates a fully cured PI as the top passivation or bonding layer for copper hybrid bonding, the interposer can be deposited with a top PI layer. By tailoring the surface and bonding conditions and characteristics of $SiO_2$ or PI, one can achieve a self-aligning bonding force stemming from direct bonding that is strong enough to cause the interposer probe card to touch down to and probe test the IC wafer yet weak enough for the interposer probe card to be released from the IC wafer. Both PI-to-PI bonding and oxide-to-oxide bonding and self-alignment are assisted by water. Following plasma activation of the surfaces of the interposer and the wafer, water is dispensed on the surfaces to form hydrophilic assembly areas. self-assembly of hydrophilic areas on the interposer and wafer surfaces can take place at low temperatures such as room temperature. During direct temporary bonding, particularly in the case of PI-to-PI bonding, an external pressure can be applied to facilitate probe tip touch down.

Figure 12A:
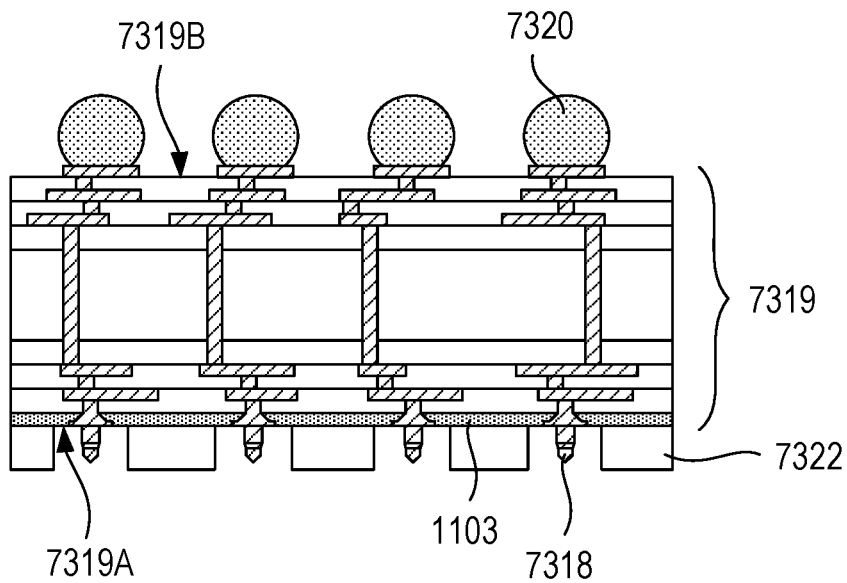
FIG. 12A to FIG. 12E illustrate operations involving the use of a release/adhesive layer to engage the probe card system with a WUT containing micro-bumps, according to some embodiments of the present disclosure.
Figure 12B:
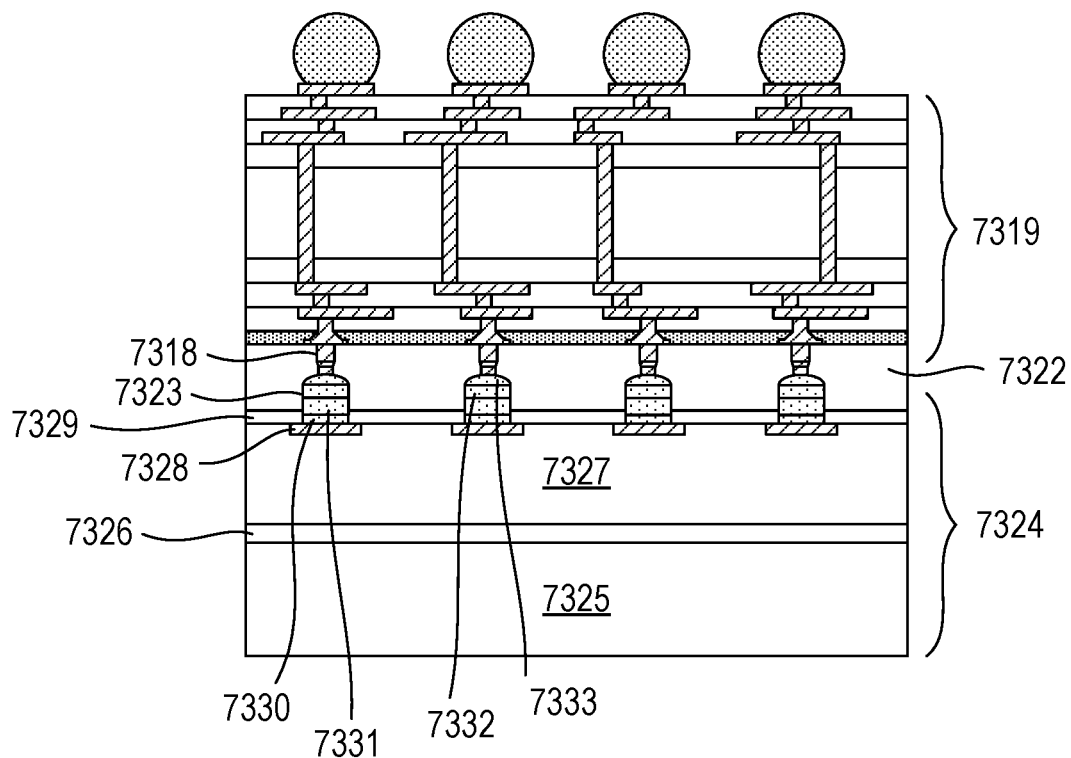
Figure 12C:
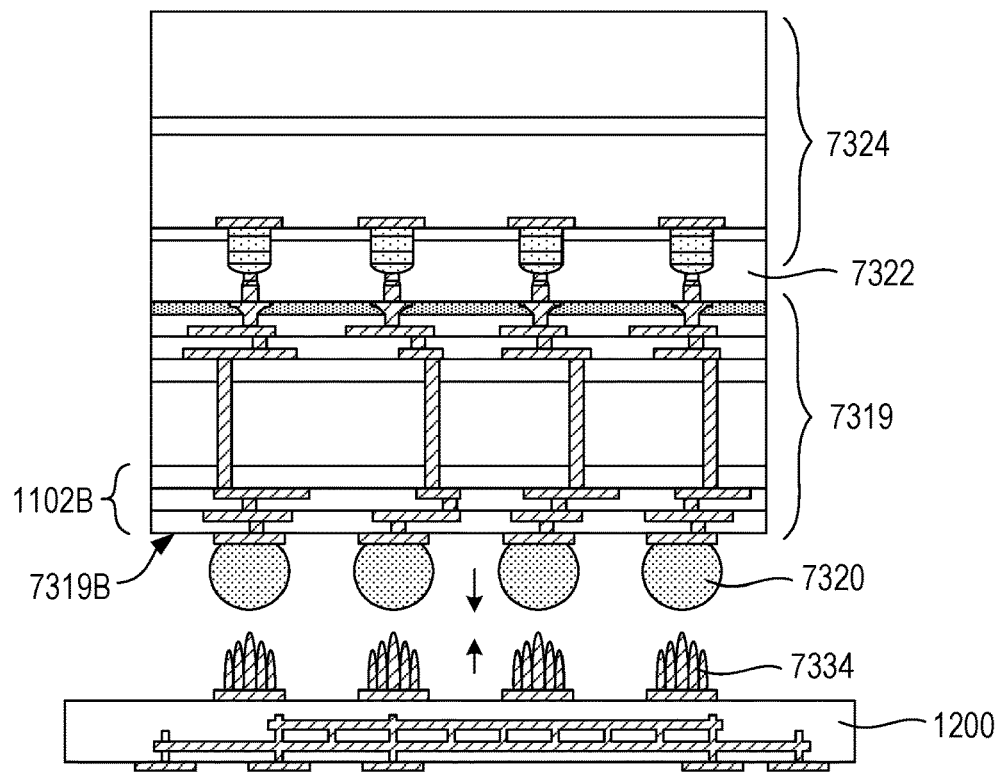
Figure 12D:
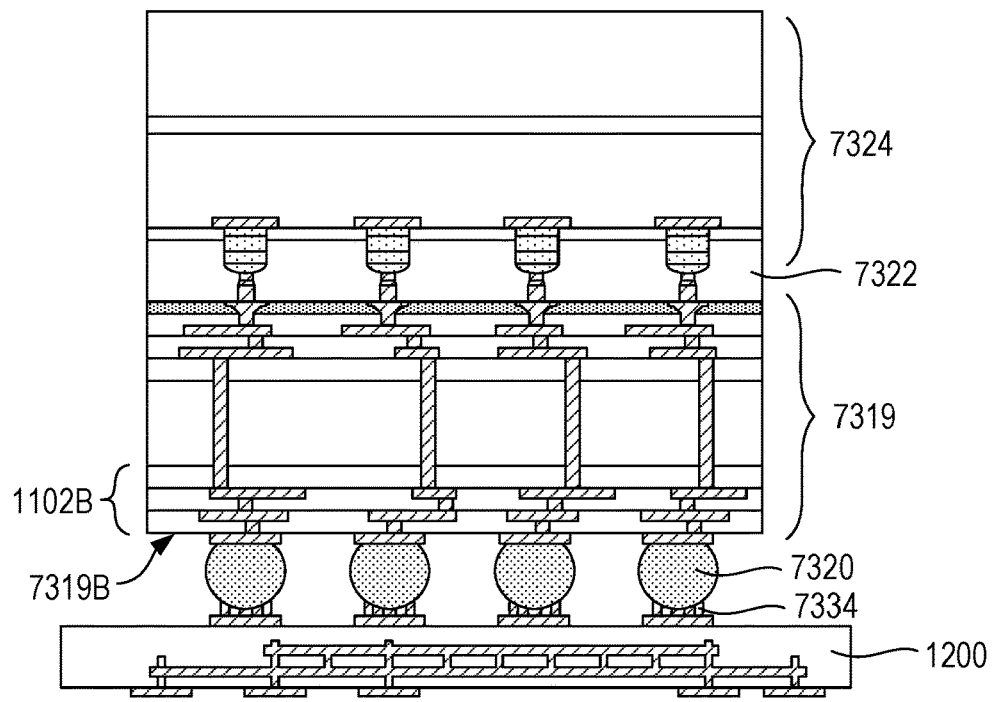
Figure 12E:
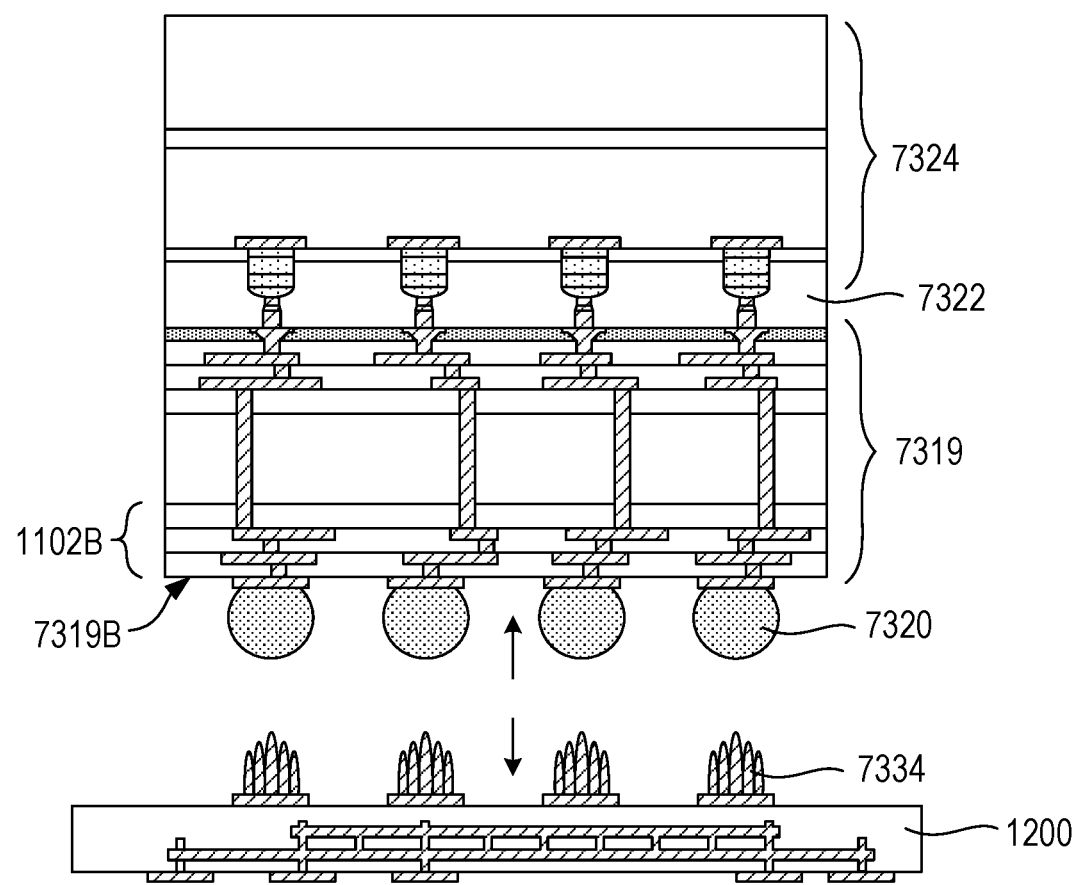
Figure 13A:
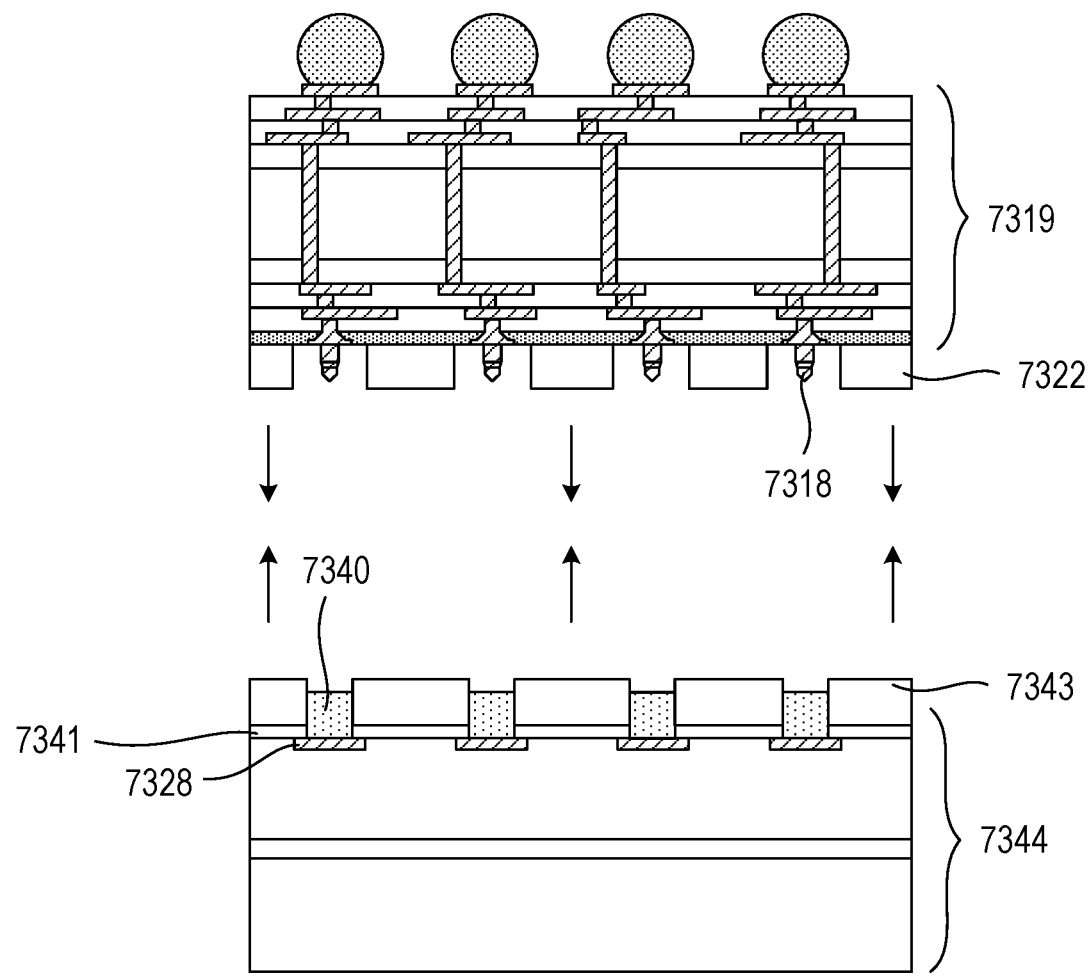
FIG. 13A to FIG. 13B illustrate operations involving the use of a release/adhesive layer to engage the probe card system with a WUT containing metal pads, according to some embodiments of the present disclosure.
Figure 13B:
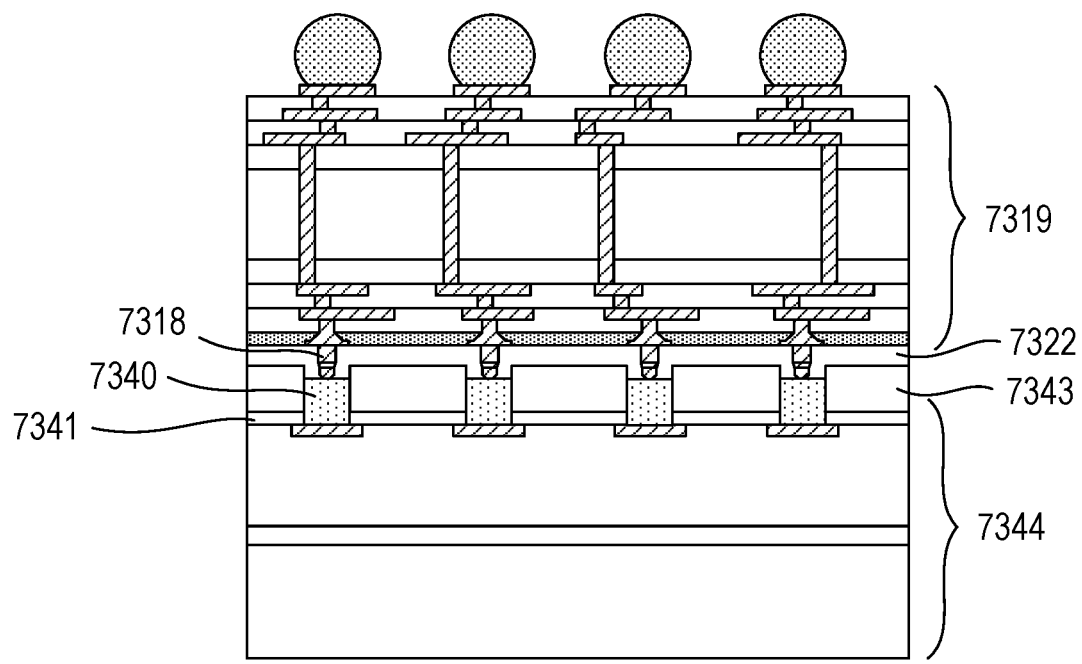

FIG. 12A to FIG. 12E illustrate operations involving the use of a release/adhesive layer to engage the probe card system with a WUT containing micro-bumps, and FIG. 13A to FIG. 13B illustrate operations involving the use of a release/adhesive layer to engage the probe card system with a WUT containing metal pads, according to some embodiments of the present disclosure.

Referring to FIG. 12A, an engagement layer 7322 can be formed on a side 7319A of the interposer 7319 opposite to a side 7319B having the solder bumps 7320. The engagement layer 7322 such as the release/adhesion layer described herein is deposited and patterned on the bonding layer 405, which is the top-most layer in the 2-layer stack or the 3-layer stack of the probe layer structure 1103, as previously addressed in FIGS. 7B, 8B, 9B. The engagement layer 7322 is formed to expose the probe tips 7318 with a suitable clearance on the side 7319A of the interposer 7319.

Referring to FIG. 12B, the interposer 7319 is engaged with the WUT 7324 having micro-bumps as contact terminals 7323 or I/Os without necessarily forming electrical connections between the probe tips 7318 and I/Os of the WUT 7324 in the first place under a first temperature (e.g., around room temperature). In some embodiments, the WUT 7324 includes a substrate 7325, a device layer 7326 over the substrate 7325, a BEOL structure 7327 over the device layer 7326, and the contact terminals 7323 over the BEOL structure 7327. In some embodiments, the contact terminals 7323 includes an under bump metallization (UBM) 7330 in contact with a contact pad 7328 of the BEOL structure 7327, a passivation layer 7329 over the BEOL structure 7327 and laterally surrounding the UBM 7330, and a solder-containing structure (e.g., a micro-bump) over the UBM 7330. In some embodiments, the contact terminal 7323 includes a copper pillar 7331 on the UBM 7330, a barrier layer 7332 on the copper pillar 7331, and a solder-containing structure (e.g., a micro-bump) 7333 on the barrier layer 7332. Electrical connections between the probe tips 7318 and the contact terminals 7323 is subsequently established under a second temperature higher than the first temperature. The second temperature is to provide limited heating (e.g., lower than 250° C.) to cure the release/adhesive layer and close the gaps between probe tips 7318 and contact terminals 7323. Since the CTE of the release/adhesive layer made of polymeric material is greater than the CTE of the probe tips or contact pad made of metal, a suitable bonding pressure should be applied to close the gap between the probe tips7318 and the contact terminals 7323. For optimal bonding of the interposer 7319 and the WUT 7324, the process can be performed in a vacuum atmosphere. The vacuum atmosphere can help eliminate or minimize voids at the bond interface and removes any residual volatiles present in the release/adhesive layer.

In some embodiments, the engagement layer 7322 can be formed on the WUT 7324 with the contact terminals 7323 exposed, instead of depositing the engagement layer on the bonding layer of the interposer 7319 prior to the engagement. Yet in other embodiments, the engagement layer 7322 can be formed on both the interposer 7319 and the WUT 7324 prior to the engagement. The engagement layer 7322 can be the release/adhesive layer in the form of two separate layers (one release layer and one adhesion layer) or a two-in-one layer. The engagement layer 7322, which is deposited by spin coating, can have a very thin thickness, such as 0.5 μm or less, after undergoing pre-bake and post-bake processes. Similarly, the adhesive layer can also be thin, with a thickness on the order of micrometers or even thinner. Commercially available two-in-one films can be as thin as 10 μm.

When the release/adhesive layer is used as the engagement layer 7322 (see FIG. 12B), the release/adhesive layer can be composed of either PI-based or silicon-based materials. It can be either thermoplastic or thermoset and can be patterned using photolithography or laser techniques. Post-baking or curing of the release/adhesive layer under the second temperature lower than 250° C. induces compressive forces, bringing the probe tips 7318 into close contact with the contact terminals 7323 in the WUT 7324. Moreover, if a laser is used to release the interposer and wafer from the release/adhesive layer, it is necessary to employ a laser-transparent interposer such as a glass or diamond interposer 7319. This allows the laser to penetrate through and reach the release/adhesive layer. In addition, mechanical actuation or other isostatic methods can be used to apply uniform pressure from the test head to the interposer/wafer assembly, as required.

Referring to FIGS. 12C to 12E, after the engagement of the interposer 7319 and the WUT 7324, the solder bumps 7320 at the side 7319B (which is in close proximity to the second interconnection structure 1102B) can be mounted on the tester assembly 1200, as shown in FIG. 12D. In such an operation, the interposer 7319 and the tester assembly 1200 of the probe card system are electrically connected via temporary connection terminals on the tester assembly 1200 involving a plurality of Pd dendritic connectors 7334, and the solder bumps 7320 on the second interconnection structure 1102B of the interposer 7319. The test or burn-in procedures for the WUT 7324 can be performed subsequent to such temporary connection. After the test or burn-in procedures is performed, the interposer 7319 and the tester assembly 1200 can be disengaged, for example, the interposer 7319 is dismounted from the tester assembly 1200, as shown in FIG. 12E, by imposing a tensile stress on the temporary connection at a low temperature such as room temperature without causing a solder reflow to the solder bumps 7320. When the engagement layer 7322 is a release/adhesive layer, the interposer 7319 and the WUT 7324 can be further disengaged by, for instance, (1) illuminating a laser at the engagement layer 7322 or macroscopically at the interposer 7319 which is at least partially transparent to the wavelength band of the laser, and/or (2) dipping the engagement layer 7322 in a polymer-swelling agent or a release liquid.

The method of using the probe card system illustrated in FIGS. 13A and 13B is similar to those described in FIG. 12A to FIG. 12E except that in FIG. 13A metal pads 7340 are used in the WUT 7344 instead of the contact terminals 7323 (e.g., solder-containing materials) previously shown in FIG. 12B. In FIGS. 13A and 13B, the metal pads 7340 are laterally surrounded by a bonding layer 7343 which can be part of the RDL or the wafer backend-of-line (BEOL) structure with a top surface higher than that of the metal pads 7340. A metal barrier layer 7341 can be disposed between the bonding layer 7343 and a contact pad 7328 or the BEOL structure. In some embodiments, the metal pads 7340 includes copper. The interposer 7319 is engaged with the WUT 7344 having metal pads 7340 as I/Os without necessarily forming an electrical connection between the probe tips 7318 and I/Os of the WUT 7344 in the first place under a first temperature (e.g., around room temperature). Subsequently, electrical connections between the probe tips 7318 and the metal pads 7340 is established under a second temperature greater than the first temperature. The second temperature is to provide limited heating (e.g., lower than 250° C.) to close the gaps between probe tips 7318 and metal pads 7340.

Although not illustrated in FIG. 13A and FIG. 13B, the test or burn-in procedures for the WUT 7344 can be performed using similar temporary connections between the interposer 7319 and the tester assembly 1200, similar to those described in FIG. 12C to FIG. 12E. After the test or burn-in procedures is performed, the interposer 7319 and the tester assembly 1200 can be disengaged, for example, the interposer 7319 is dismounted from the tester assembly 1200 by imposing a tensile stress at a low temperature on the temporary connection without causing a solder reflow to the solder bumps 7320. When the engagement layer 7322 is a release/adhesive layer, the interposer 7319 and the WUT 7344 can be further disengaged by, for instance, (1) illuminating a laser at the engagement layer 7322 or macroscopically at the interposer 7319 which is at least partially transparent to the wavelength band of the laser, and/or (2) dipping the engagement layer 7322 in a polymer-swelling agent or a release liquid.

In addition to utilizing adhesion forces, as described in FIG. 12A to FIG. 13B, customization of direct bonding processes and surface conditions can also be employed to facilitate high-quality, self-aligned wafer testing. For example, PI-to-PI bonding or oxide-to-oxide bonding can be utilized to generate a bonding force that is strong enough to establish contact between the probe tips and micro-bumps or metal pads, but also low enough to allow for easy separation of the interposer or probe card system from the IC wafer after the testing or burn-in operations. This approach is not limited to the use of thermal expansion-matched glass or diamond interposers which are transparent to laser for release/adhesion layer removal and can be applied to a large variety of interposers including silicon, diamond, and silicon-diamond interposers.

Figure 14A:
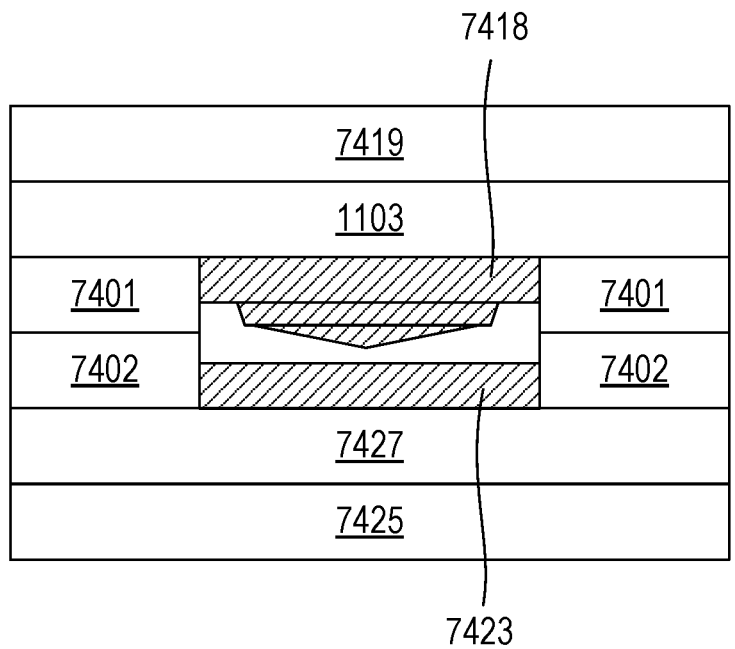
FIG. 14A to FIG. 14B illustrate a simplified direct bonding process flow, according to some embodiments of the present disclosure.
Figure 14B:
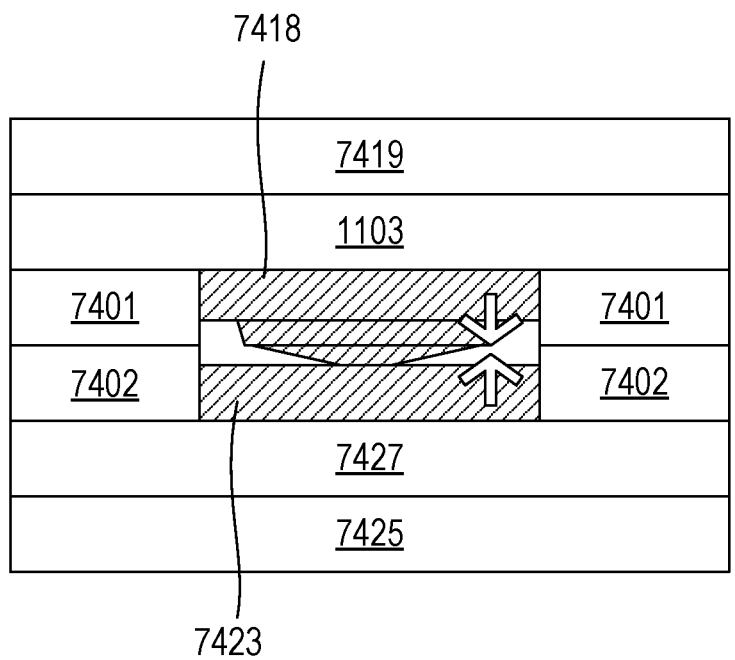

FIGS. 14A and 14B demonstrate a simplified direct bonding process flow with direct bonding at a low first temperature such as room temperature to begin with so as not to establish strong dielectric-to-dielectric bonding between the WUT and probe tips, as shown in FIG. 14A. This is followed by heating at a higher second temperature which is again low enough so as not to create a permanent bond between dielectrics but high enough close the gaps between the probe tips and the pads being probed (under the application of an external pressure as needed) as shown in FIG. 14B. In such demonstration, the probe layer structure 1103 on the interposer 7419 has a first bonding layers 7401 configured to be bonded with a second bonding layers 7402 on a BEOL structure 7427 (or is part of 7427) over the wafer 7425. By using the low second temperature (and an external pressure as needed), the probe tips 7418 can be brought into contact with the pads 7423. In some specific examples, the second temperature should be lower than 250° C. for oxide-to-oxide and PI-to-PI direct bonding.

Figure 15A:
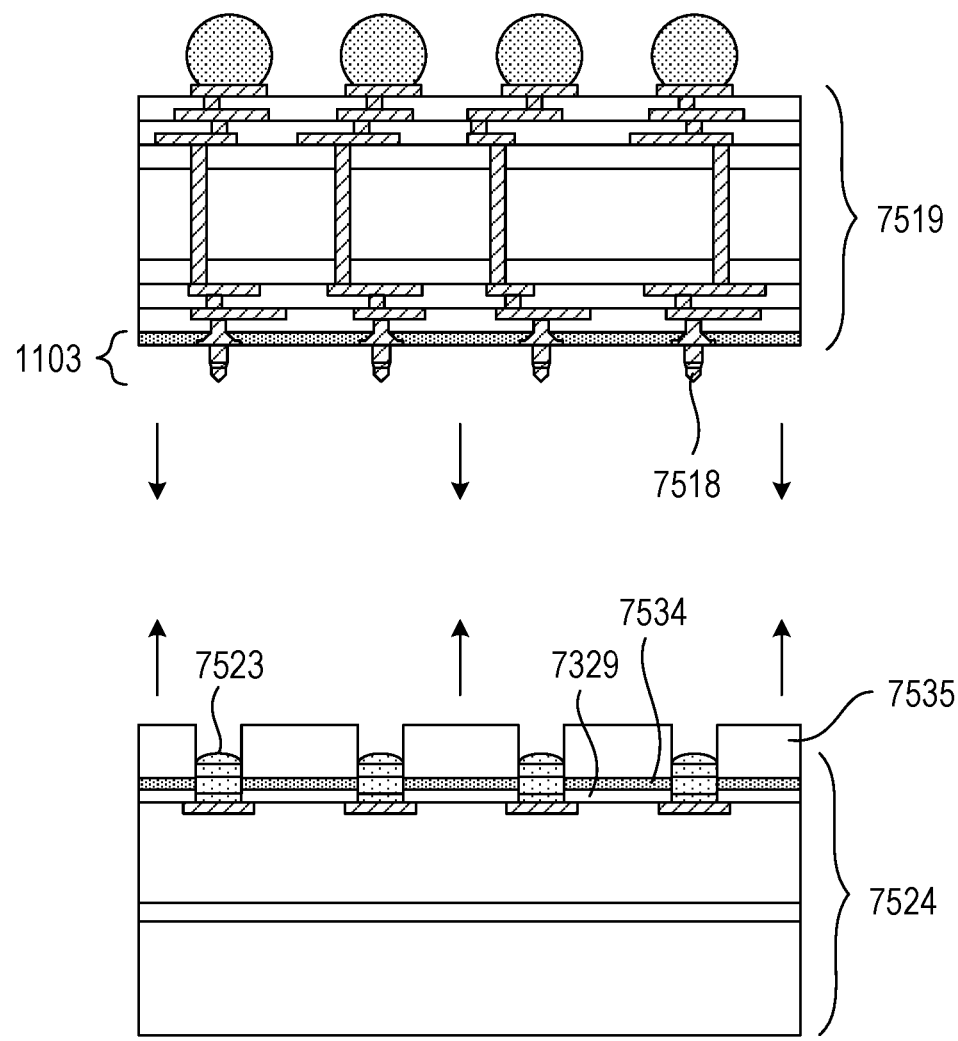
FIG. 15A to FIG. 15B illustrate operations involving the use of direct bonding to engage the probe card system with a WUT containing micro-bumps, according to some embodiments of the present disclosure.
Figure 15B:
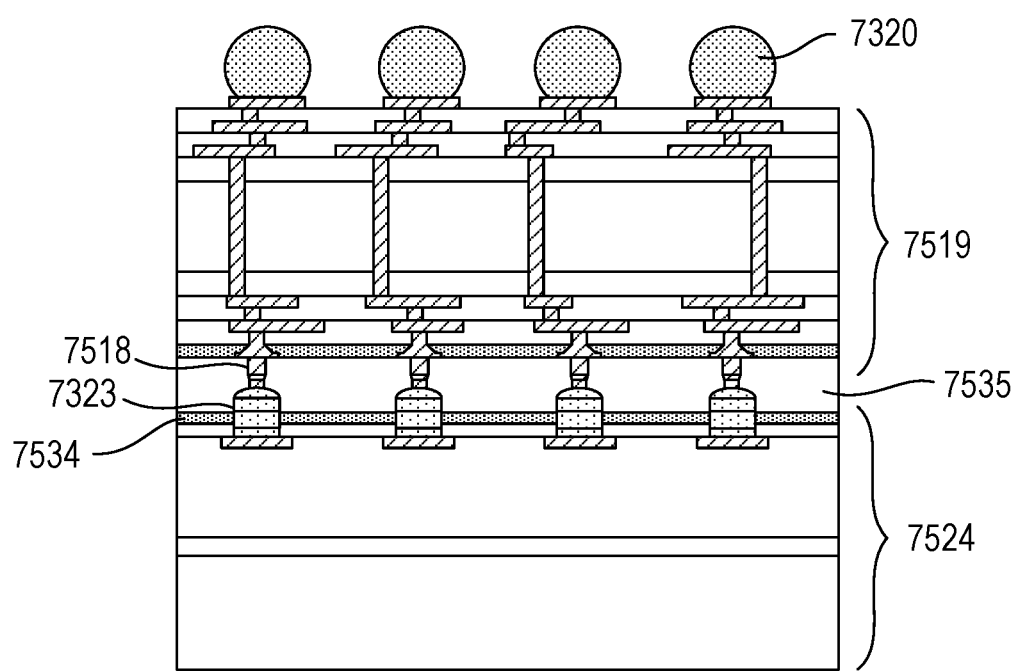

FIG. 15A to FIG. 15B illustrate operations involving the use of direct bonding to engage the probe card system with a WUT containing micro-bumps, according to some embodiments of the present disclosure. Referring to FIGS. 15A and 15B, when employing PI-to-PI bonding or oxide-to-oxide bonding based on PI or oxide bonding layers on the interposer 7519 and the WUT 7524, a sacrificial layer 7534 and a bonding layer 7535 are formed on the WUT 7524 prior to engagement. The bonding layer 7535 can be based on either $SiO_2$ or PI, which is similar to that used to form the bonding layer 405 of the probe layer structure 1103, as previously discussed in FIG. 7B. Typically, the material of the bonding layer 7535 and the bonding layer 405 are substantially identical to facilitate direct bonding. In FIG. 15A, the sacrificial layer 7534 is formed on the WUT as needed to facilitate the separation between the bonding layer 7535 and the WUT 7524 subsequent to the wafer test or burn-in procedures and bonding layer can contain access holes for the etchant to facilitate sacrificial layer removal.

In cases where the heights of micro-bumps, the heights and shapes of the probe tips, and the surface BEOL structure (or RDL layer) on the WUT 7524 prevent direct contact bonding between the WUT 7524 and the interposer 7519 from taking place, the sacrificial layer 7534 and the bonding layer 7535 are formed only on the WUT 7524 prior to the wafer test. The sacrificial layer 7534 formed on the WUT 7524 can be the same as or different from the sacrificial layer 401 used in the 2-layer stack or 3-layer stack of the probe layer structure 1103, as previously described in FIGS. 7B, 8B, and 9B. The sacrificial layer 401 in the probe layer structure 1103 is removable in an etchant identical to or different from an etchant used to remove the sacrificial layer 7534 formed on the WUT 7524. The sacrificial layer 7534 of the WUT 7524 can be released in a way similar to the process to remove the sacrificial layer 401 of the probe layer structure 1103 with no damage incurred to the underlying structure.

In FIG. 15B, the interposer 7519 and the WUT 7524 are engaged without forming permanent dielectric-to-dielectric bond between them. The engagement can be separated under two scenarios: (1) PI-to-PI bonding, and (2) oxide-to-oxide bonding.

To achieve full-wafer engagement involving PI-to-PI bonding, it is crucial to activate the polyimide surfaces through oxygen plasma activation. This process generates low-density hydrophilic groups on the polyimide surface, which enhances the adsorption of water molecules introduced during a de-ionized water-wetting process. The adsorbed water molecules, in turn, create high-density —OH (-hydroxyl) groups that facilitate pre-bonding at room temperature.

Following polyimide surface activation and wetting, the self-aligned PI-to-PI hybrid bonding can occur at a relatively low temperature below 250° C., for example, room temperature, for a short duration, particularly when a permanent bond is not desired. Both the plasma process and the wetting/hydration process can be required to achieve satisfactory interposer-to-WUT engagement and temporary bonding. There are some parameters that can be manipulated to achieve an appropriate bond or contact force for probe tip-pad contact while ensuring easy separation of the interposer from the wafer include plasma activation time, volume of introduced water, bonding temperature, and bonding time.

In the embodiments when the PI-to-PI bonding is employed, specifically based on pyromellitic dianhydride (PMDA) and 4,4'-diaminodiphenyl ether (4,4'-ODA), the shear strength can be tailored by adjusting various parameters such as the volume of introduced water, bonding time, and oxygen ($O_2$) plasma activation time. This allows for achieving a shear strength ranging from 3.3 MPa to 35.3 MPa, a factor of 10. Shear strengths of approximately 3 MPa or lower indicate non-bonded wafers that can be easily separated.

Moreover, a window exists between a shear strength of 3.3 MPa and 35.3 MPa for direct bonding, which provides sufficiently strong forces for probe tip-to-pad contact while still allowing for separation of the interposer from the wafer using methods such as immersion in a heated polyimide swelling agent such as N-methyl-2-pyrrolidone (NMP).

Generally, direct oxide-to-oxide bonding can follow the following process sequence: (a) dangling bond formation and bonding between hydroxyl groups and water molecules through plasma activation using gases such as $O_2$ (oxygen), $N_2$ (nitrogen), or Ar (argon); (b) defect removal through deionized water cleaning and scrubbing; (c) bonding of wafers (or wafer and wafer-sized interposer) with oxide bonding layers at room temperature and atmospheric pressure using van der Waals hydrogen bonds between two to three monolayers of water molecules and polar hydroxyl (—OH) groups found on both native and thermal $SiO_2$; (d) formation of van der Waals bonds between $H_2O$ molecules and silanol groups (Si—OH—$(H_2O)_x$—HO—Si; silanol group=Si—OH) on the top and bottom wafer surfaces; and (e) annealing to remove water molecules at the interface and form covalent bonds. This annealing process is typically performed at temperatures below 400° C. for a few hours, especially when aiming for a permanent bond to prevent melting of inter-metal layers and diffusion of implanted dopants. Exposure to a temperature below 250° C. for a shorter period of time is needed here to ensure enough contact forces and easier interposer-to-WUT separation. In the case of oxide-to-oxide bonding, adjusting various factors such as oxide type, deposition technique, process conditions (e.g., plasma gas, plasma power), surface roughness related to chemical mechanical polish (CMP), surface cleanliness, mono- to multiple layers of water molecules from de-ionized cleaning, bonding conditions (e.g., temperature and speed), and anneal conditions (e.g., anneal temperatures, anneal time, and number of annealing steps) can also result in shear strength adjustments between the interposer (i.e., with the $SiO_2$-based bonding layer) and the wafer (i.e., with the $SiO_2$-based bonding layer) by a factor of over 30, ranging from 3 MPa to 100s of MPa.

To prevent void formation caused by water droplet formation (the Joule-Thomason expansion effect) at the wafer edge during direct bonding, it is essential to control the parameters such as plasma conditions, surface roughness, degree of cleanliness, wafer warpage/flatness, and bonding conditions.

Although not illustrated in FIG. 15A and FIG. 15B, the test or burn-in procedures for the WUT 7524 can be performed using the temporary connections described in FIG. 12C to FIG. 12E. After the test or burn-in procedures is performed, the interposer 7519 and the tester assembly 1200 (not shown) can be disengaged, for example, the interposer 7519 is dismounted from the tester assembly 1200 by imposing a tensile stress on the temporary connection without causing a solder reflow to the solder bumps 7320. When the engagement layer 7535 is a direct bonding layer (e.g., PI or oxide layer), the interposer 7519 and the WUT 7524 can be further disengaged by, for instance, applying a tensile stress to the engagement layer 7535.

Figure 16A:
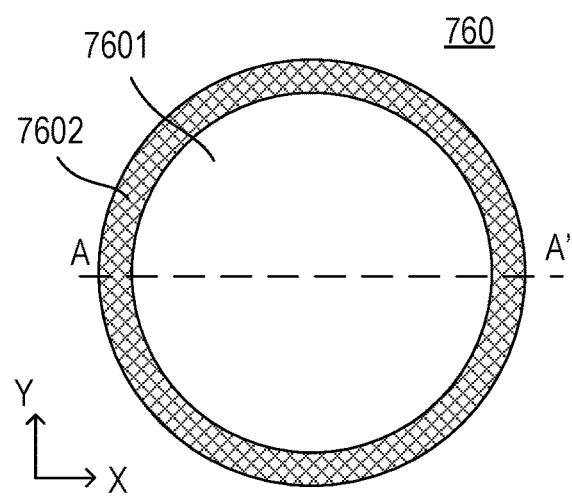
FIG. 16A and FIG. 16B respectively illustrates structure and method for tailoring direct bonding forces, according to some embodiments of the present disclosure.
Figure 16A:
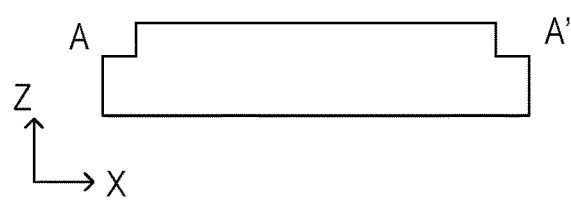
Figure 16B:
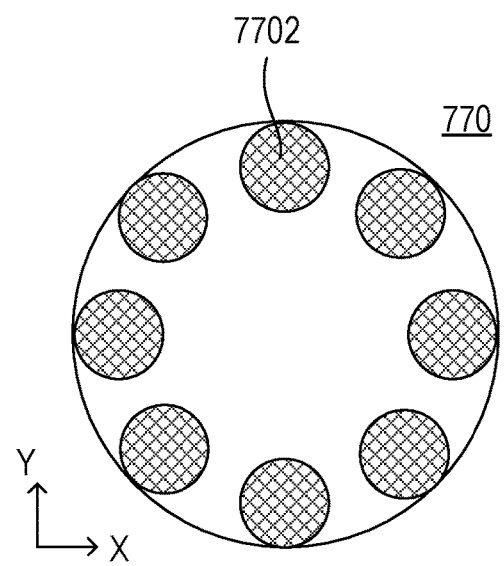

FIG. 16A and FIG. 16B, respectively, illustrates a structure and a method for tailoring direct bonding forces in association with the direct bonding examples described herein but not limited to FIG. 15A, FIG. 15B, FIG. 17A, FIG. 17B, FIG. 18A, and FIG. 18B, according to some embodiments of the present disclosure. Oxide-to-oxide bonding can be carried out on a platform or chuck with a flat central zone and a lower outer annular zone. FIG. 16A shows a design of wafer chuck 760 that facilitate water molecule to escape. The wafer chuck 760 having a flat central zone 7601 and a lower outer annular zone 7602 to disrupt the van der Waals forces at the outer annular zone (the operations (c) and (d) as above mentioned), the edge portion of a mounted wafer is biased towards the outer annular zone 7602. This biasing creates an edge gap that allows water molecules to escape at the wafer edge. The annular zone approach can be extended to cover more multiple zones (not illustrated) to disrupt van der Waals force in more than one zone (and away from the zones containing micro-bumps or metal pads, and allow one to fine tune both oxide-to-oxide bonding and PI-to-PI bonding processes for wafer test.

Another approach to tailor bonding forces and facilitate easy interposer-to-wafer separation has to do with leaving patches of hydrophobic areas 7702 on a WUT 770 away from pads to be probed (presumably close to a central portion of the WUT 770) prior to plasma activation, and water dipping or wetting, as shown in FIG. 16B. Take silicon (or silicon oxide as bare silicon is normally covered with at least a few angstroms of native oxide), for instance, hydrophobic areas 7702 can be created on silicon or oxide surfaces by an operation involving about 1% hydrofluoric acid dip after RCA (Radio Corporation of America) cleaning but without any subsequent deionized water rinse. The RCA clean is a standard set of wafer cleaning steps to be performed prior to high-temperature wafer processes. It involves the following processes in RCA clean sequence: (1) removal of the organic contaminants through organic and particle clean, and (2) removal of thin oxide layer with oxide strip, and removal of ionic contamination through ion clean.

Keeping other conditions the same, adjustments in plasma activation and water dipping conditions and processes can be utilized to tailor bonding forces for both PI-to-PI bonding and oxide-to-oxide bonding. Generally, surfaces treated with both water and plasma exhibit significantly higher shear strengths compared to surfaces treated with plasma alone (i.e., yielding the lowest shear strength) or water alone (i.e., yielding the second lowest shear strength), all while maintaining other conditions constant.

For oxide-to-oxide hybrid bonding, achieving high component flatness and ensuring surface cleanliness are crucial to prevent electrical interconnection failures. This is particularly important due to the high hardness and poor deformation characteristics of silicon dioxide. In contrast, PI-to-PI bonding offers advantages in terms of surface roughness tolerance and component flatness. This is attributed to the lower modulus and more compliant characteristics of polyimides, allowing for greater flexibility in bonding.

Figure 17A:
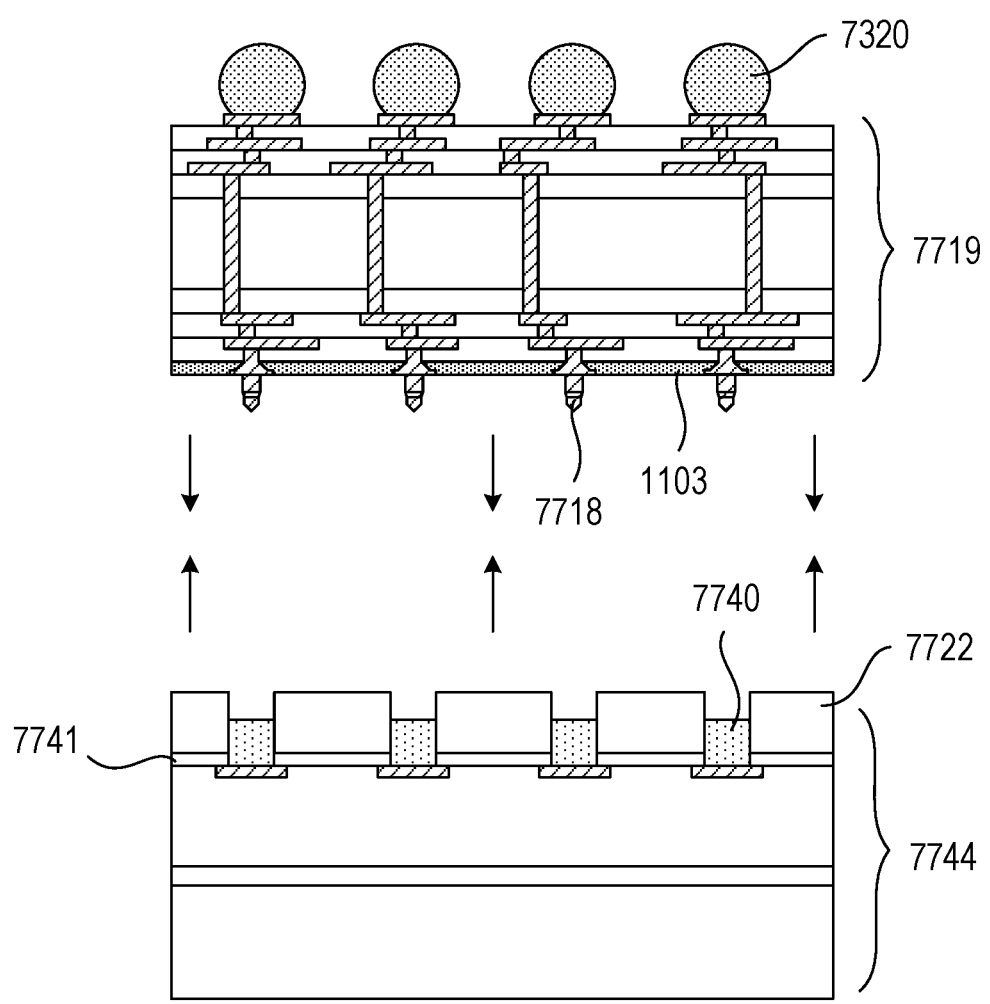
FIG. 17A to FIG. 17B illustrate operations involving the use of direct bonding to engage the probe card system with a WUT containing metal pads, according to some embodiments of the present disclosure.
Figure 17B:
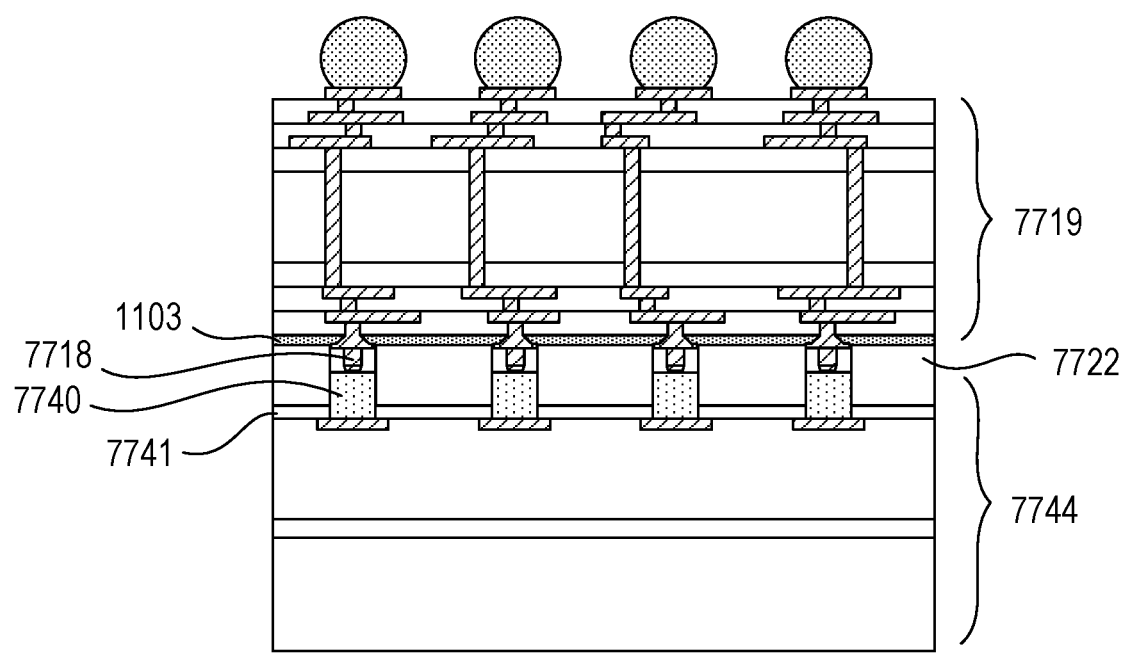

FIG. 17A to FIG. 17B illustrate operations involving the use of direct bonding to engage the probe card system with a WUT with metal pads, according to some embodiments of the present disclosure. The method of using the probe card system illustrated in FIGS. 17A and 17B is similar to those described in FIG. 15A to FIG. 15B except that metal pads 7740 are used in the WUT 7744 (see FIG. 17A) instead of the contact terminals 7523 (e.g., solder-containing materials) previously shown in FIG. 15A. In FIGS. 17A and 17B, the metal pads 7740 are laterally surrounded by a bonding layer 7722 which can be part of the RDL or the wafer BEOL structure. The interposer 7719 is engaged with the WUT 7744 containing metal pads 7740 as I/Os without necessarily forming a permanent bond between the bonding layer of the interposer and the top or bonding layer of the WUT 7744 under a first temperature (e.g., around room temperature). Subsequently, electrical connections between the probe tips 7718 and the metal pads 7740 are established under a second temperature greater than the first temperature. The second temperature is to provide limited heating (e.g., lower than 250° C.) to close the gaps between probe tips 7718 and metal pads 7740.

Although not illustrated in FIG. 17A and FIG. 17B, similar to those described in FIG. 12C to FIG. 12E, the test or burn-in procedures for the WUT 7524 can be performed after such temporary connection. After the test or burn-in procedures being performed, the interposer 7719 and the tester assembly 1200 (not illustrated) can be disengaged, for example, the interposer 7719 is dismounted from the tester assembly 1200 by imposing a tensile stress on the temporary connection without causing a solder reflow to the solder bumps 7320. When the engagement layer or the bonding layer 7722 is a direct bonding layer (e.g., PI or oxide layer), the interposer 7719 and the WUT 7744 can be further disengaged by, for instance, applying a tensile stress to the bonding layer 7722.

Figure 18A:
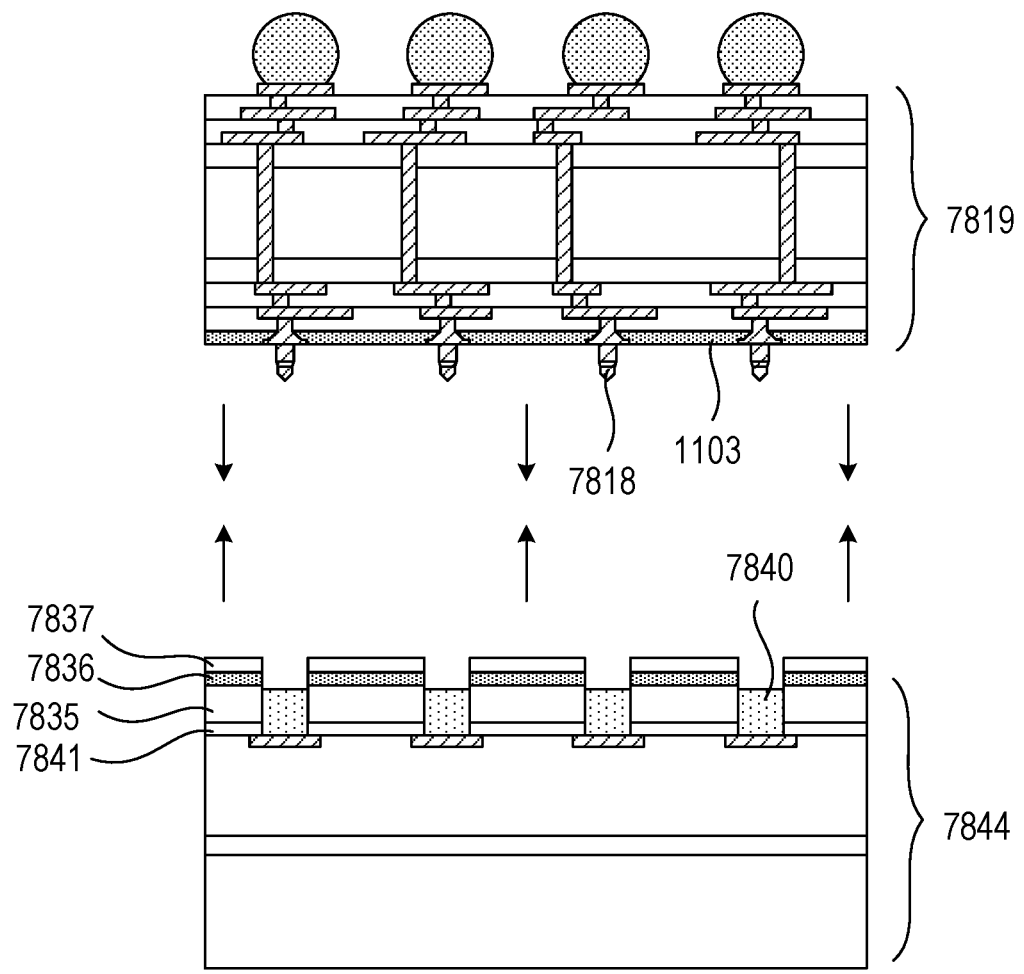
FIG. 18A to FIG. 18B illustrate operations involving the use of direct bonding to engage the probe card system with a WUT containing metal pads, according to some embodiments of the present disclosure.
Figure 18B:
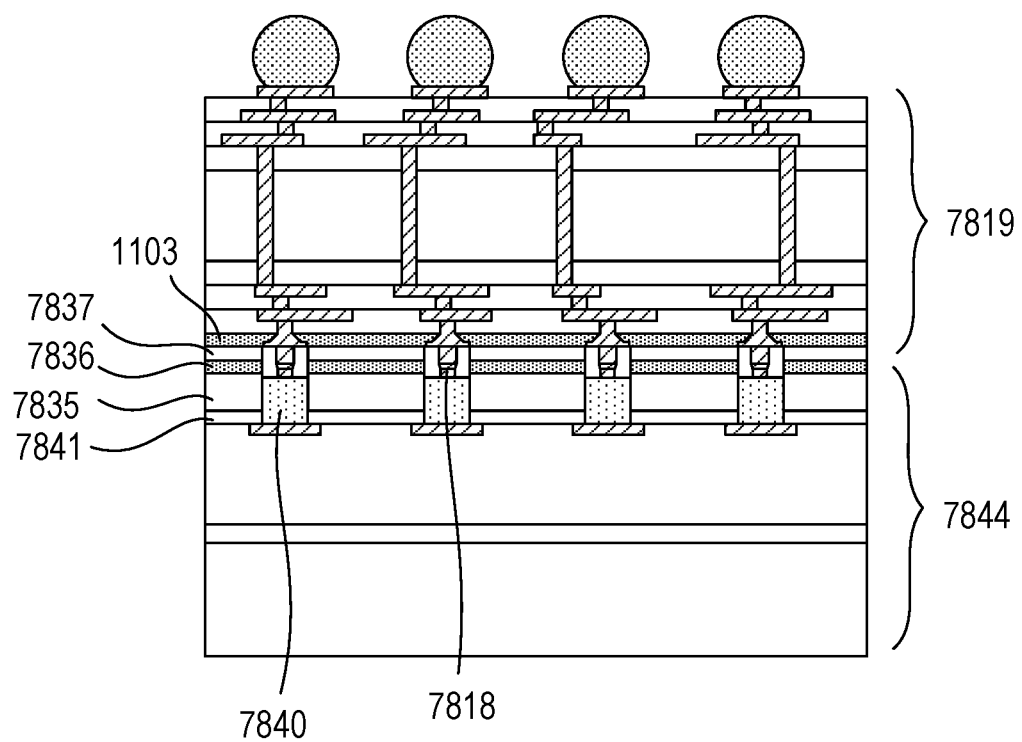

FIG. 18A to FIG. 18B illustrate operations involving the use of direct bonding to engage the probe card system with a WUT containing metal pads, according to some embodiments of the present disclosure. FIGS. 18A and 18B present an alternative approach when direct bonding of the probe card system and the WUT is used, in which the separation of the interposer 7819 of the probe card system and WUT 7844 is challenged. This approach differs from the embodiment illustrated in FIGS. 17A and 17B in that the former incorporates an additional bonding layer 7837 and an extra sacrificial layer 7836 on the WUT 7844. The bonding layer 7837 of the WUT 7844 serves as a direct bonding layer to be engaged with the bonding layer in the 2-layer stack or 3-layer probe layer stack of the interposer 7819. The sacrificial layer 7836 may include a different material compared to the sacrificial layer 401, as previously described in FIG. 7B, on the 2-layer stack or 3-layer stack of the interposer 7819 in terms of etching selectivity. Following the completion of the wafer test or burn-in procedures, the sacrificial layer 7836 may be etched to facilitate separation between the WUT 7844 and the interposer 7819. When the engagement layer or the bonding layer 7837 is a direct bonding layer (e.g., a PI or oxide layer), the interposer 7819 and the WUT 7844 can be further disengaged by, for instance, applying an etching solution selective to the sacrificial layer 7836.

The sacrificial layer 401 on the interposer can be removed in a separate etching operation after the probe tips become worn out through regular use. The embodiment disclosed in FIGS. 18A and 18B involves lifting the probe layer structure 1103 through etching the sacrificial layer 401, as previously described in FIGS. 7A and 7B, on the 2-layer stack or 3-layer stack of the interposer 7819 (which also applies to the interposer 7819 in FIGS. 18A and 18B). In scenarios involving high-volume and high-end applications, particularly with large, thin, and high-value dies, the parallel processing of probe layer structure deposition and sacrificial layer release can be an effective approach to achieve wafer-level testing for KGD and even wafer-level burn-in. This process can be facilitated using the disclosed full-wafer contactor or probe card system, enabling efficient and comprehensive wafer-level testing.

Figure 19:
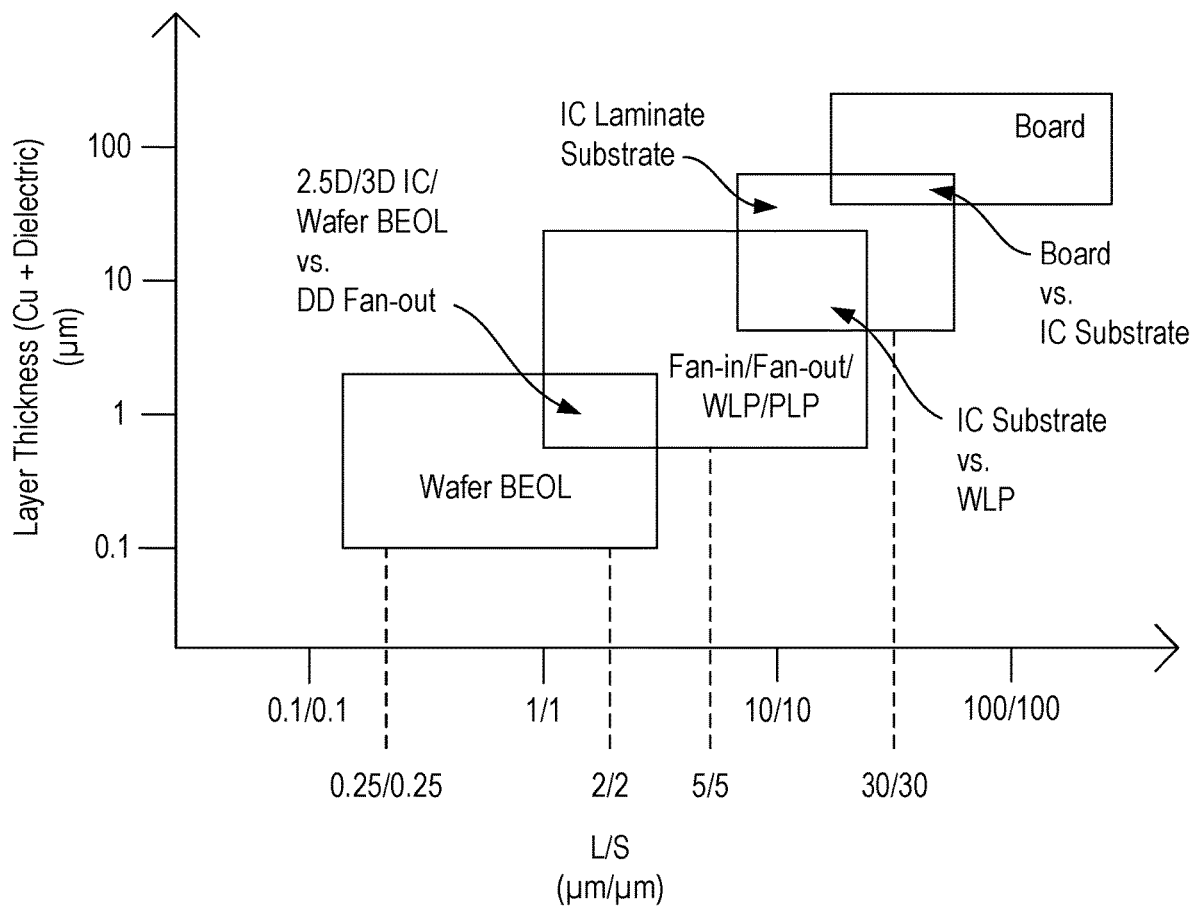
FIG. 19 illustrate advanced wafer BEOL and advanced packaging technology landscape, according to some embodiments of the present disclosure.

FIG. 19 illustrates advanced wafer BEOL and advanced packaging technology landscape, according to some embodiments of the present disclosure. Today, direct bonding or copper hybrid bonding can achieve an astounding accuracy on the order of about 500 nanometers, whereas micro-bump based flip chip an accuracy of 3 µm. By tapping into the adhesion and direct bonding force induced actuation (derived from advanced packaging and copper hybrid bonding), the methodologies, structures and processes disclosed herein can scale to ever-finer pitches as flip chip and copper hybrid bonding continue to advance and miniaturize, way beyond what the conventional "macroscopic" mechanical actuation can hope to achieve.

Probe tip technologies such as nanotechnology and variations of nano-MEMS technologies are also capable of achieving ultrafine pitches as in the case of wafer BEOL and interposers. The contact forces imparted or afforded by wafer-level release/adhesive layers and wafer-level direct bonding can be implemented in production involving ultrafine pitches (below 2 µm/2 µm L/S and below 10/6 µm in bonding/interconnect pitch) and ultrahigh-I/Os and they will also scale with wafer BEOL and advanced SiP technologies based on flip chip micro-bumps and copper hybrid bonding.

The foregoing outlines structures of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A probe card system, comprising:
   a tester assembly;
   a probe head body configured to couple with the tester assembly;
   a first interconnection structure on a first side of the probe head body; and
   a probe layer structure on the first interconnection structure on the first side of the probe head body which is configured to engage with a wafer under test (WUT), wherein the probe layer structure comprises:
   a sacrificial layer in connection with the first interconnection structure;
   a bonding layer in connection with the sacrificial layer; and
   a plurality of probe tips each in connection with respective conductive patterns exposed from the bonding layer and electrically coupled to the first interconnection structure,
   wherein the sacrificial layer allows removal of the bonding layer and the plurality of probe tips via an etching operation.

2. The probe card system of claim 1, further comprising a second interconnection structure on a second side of the probe head body opposite to the first side with the second interconnection structure including at least a solder connector which is configured to engage with the tester assembly of the probe card system.

3. The probe card system of claim 2, wherein the probe head body is composed of a material identical to that of the WUT, glass, diamond, or a material with a coefficient of thermal expansion matching or close to that of the WUT and one or more through vias in the probe head body electrically connecting the first interconnection structure and the second interconnection structure.

4. The probe card system of claim 3, further comprising one or more fluidic channels in between the through vias in the probe head body to facilitate thermal management during testing by flowing a liquid through the fluidic channels in the probe card system and a heat exchanger outside the probe card system.

5. The probe card system of claim 2, further comprising one or more optical components in at least one of the probe head body, the first interconnection structure, the second interconnection structure, or the probe layer structure.

6. The probe card system of claim 1, wherein the probe layer structure further comprises: a complaint layer which is composed of elastomers, wherein a first portion of the complaint layer is between the sacrificial layer and the bonding layer, and a second portion of the compliant layer is between the sacrificial layer and the respective conductive patterns of the probe layer structure.

7. The probe card system of claim 6, wherein the sacrificial layer is composed of an etchable metal, an etchable non-metal, or a combination thereof.

8. The probe card system of claim 1, further comprising a plurality of through holes in the bonding layer which exposes the sacrificial layer to facilitate sacrificial layer removal.

9. The probe card system of claim 1, wherein the plurality of probe tips comprises a vertical tip, a dendritic tip, a micro-cantilever tip, a pyramid tip, or a combination thereof.

10. The probe card system of claim 9, wherein a minimal pitch of the plurality of probe tips is smaller than 40 μm with an area of the probe layer structure comparable to an area of the WUT.

11. A method of manufacturing a probe card system with the method comprising:
  receiving a carrier wafer having a first surface to be masked;
  forming a cavity in the carrier wafer from the masked first surface;
  forming a probe tip by filling the cavity with a conductive material;
  receiving an interposer with the interposer comprising:
    a probe head body; and
    a first interconnection structure on a first side of the probe head body;
  bonding the first surface of the carrier wafer and the first interconnection structure of the interposer; and
  releasing the probe tip from the carrier wafer by an etching operation.

12. The method of claim 11, further comprising:
  forming a probe layer structure over the first interconnection structure of the interposer prior to bonding of the carrier wafer and the interposer, which comprises:
    forming a first sacrificial layer in connection with the first interconnection structure; and
    forming a bonding layer in connection with the first sacrificial layer.

13. The method of claim 12, wherein the formation of the probe tip by filling the cavity with the conductive material comprises:
  forming a second sacrificial layer in the cavity;
  forming a seed layer in the cavity subsequent to forming the second sacrificial layer; and
  performing an electroplating operation to fill the cavity.

14. A method of using a probe card system with the method comprising:
  receiving an interposer with the interposer comprising:
    a probe head body;
    a first interconnection structure on a first side of the probe head body; and
    a probe layer structure on the first side of the probe head body which is configured to engage with a wafer under test (WUT),
    wherein the probe layer structure comprises:
      a first sacrificial layer in connection with the first interconnection structure;
      a bonding layer in connection with the compliant layer; and
      a plurality of probe tips each in connection to respective conductive patterns exposed from the bonding layer and electrically connected to the first interconnection structure,
  forming an engagement layer on at least one of the bonding layer of the interposer or a contact terminal layer of the WUT;
  which engages the interposer and the WUT at a first temperature without forming an electrical connection between the probe tips and contact terminals of the contact terminal layer; and
  forming an electrical connection between the probe tips and contact terminals at a second temperature,
  wherein the second temperature is greater than the first temperature.

15. The method of claim 14, wherein the formation of the engagement layer comprises forming a laser-releasable adhesive layer or forming an organic or inorganic direct bonding layer.

16. The method of claim 15, wherein the formation of the organic or inorganic direct bonding layer comprises:
  forming a second sacrificial layer on the contact terminal layer; and
  forming a polyimide layer or an oxide layer over the second sacrificial layer,
  wherein the first sacrificial layer is removable in an etchant identical to or different from an etchant used to remove the second sacrificial layer.

17. The method of claim 15, further comprising:
  disengaging the interposer and the WUT by at least one of (1) illuminating a laser at the interposer at least partially transparent to the wavelength band of the laser, (2) dipping the bonding layer in a polymer-swelling agent or a release liquid, or (3) applying a tensile stress to the bonding layer.

18. The method of claim 14, wherein the interposer further comprises a second interconnection structure on a second side of the probe head body, and the method further comprising:
  engaging the interposer and a tester assembly of the probe card system via a temporary connection terminal on the tester assembly and a solder bump on the second interconnection structure; and
  disengaging the interposer and the tester assembly without causing a solder reflow to the solder bump.

19. The method of claim 14, further comprising removing the probe layer structure from the interposer via a lift-off operation using an etchant that removes the first sacrificial layer.

20. The method of claim 14, wherein engaging the interposer and the WUT comprises:
  increasing hydroxyl groups on the engagement layer by performing a plasma activation on the engagement layer, wetting the engagement layer with water, or a combination thereof.

* * * * *